(12) United States Patent
Etoh

(10) Patent No.: US 10,324,471 B2
(45) Date of Patent: Jun. 18, 2019

(54) AUTONOMOUS TRAVELING APPARATUS

(71) Applicant: Sharp Kabushiki Kaisha, Sakai, Osaka (JP)

(72) Inventor: Atsushi Etoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 155 days.

(21) Appl. No.: 15/648,520

(22) Filed: Jul. 13, 2017

(65) Prior Publication Data

US 2018/0032081 A1 Feb. 1, 2018

(30) Foreign Application Priority Data

Jul. 27, 2016 (JP) .................................. 2016-147040

(51) Int. Cl.
*G05D 1/02* (2006.01)
*G05D 1/10* (2006.01)

(52) U.S. Cl.
CPC ......... *G05D 1/0221* (2013.01); *G05D 1/0248* (2013.01); *G05D 1/0255* (2013.01); *G05D 1/10* (2013.01)

(58) Field of Classification Search
USPC ....................................................... 701/23
See application file for complete search history.

(56) References Cited

U.S. PATENT DOCUMENTS

| | | | |
|---|---|---|---|
| 2002/0075180 A1* | 6/2002 | Sakai | G01S 15/931 342/52 |
| 2013/0155222 A1* | 6/2013 | Min | G06K 9/00818 348/118 |
| 2014/0095009 A1* | 4/2014 | Oshima | G05D 1/0238 701/23 |
| 2015/0105906 A1* | 4/2015 | Ueda | G05D 1/024 700/255 |
| 2016/0125746 A1* | 5/2016 | Kunzi | G05D 1/0088 701/11 |
| 2017/0238460 A1* | 8/2017 | MacKean | A01M 21/02 |
| 2018/0032081 A1* | 2/2018 | Etoh | G05D 1/0221 |
| 2018/0304468 A1* | 10/2018 | Holz | B25J 9/1697 |
| 2018/0306587 A1* | 10/2018 | Holz | B66F 9/063 |

FOREIGN PATENT DOCUMENTS

JP 2005-176622 A 7/2005

* cited by examiner

*Primary Examiner* — Tyler D Paige
(74) *Attorney, Agent, or Firm* — Keating & Bennett, LLP

(57) ABSTRACT

An autonomous traveling apparatus includes a body, a travel control unit that controls a drive member to cause the autonomous traveling apparatus to travel, an obstacle detection unit that detects an object located within a predetermined obstacle sensing area, a restart switch disposed on the body and operable to cause the autonomous traveling apparatus to resume traveling from a stop mode, and a restart control unit that, when an operation of activating the restart switch is performed by a user, causes the obstacle detection unit to resume obstacle detection so as not to detect the user as an obstacle until the user who has performed the operation of activating the restart switch moves out of the obstacle sensing area, and causes the autonomous traveling apparatus to resume traveling.

17 Claims, 15 Drawing Sheets

SW1

SW1    SW2

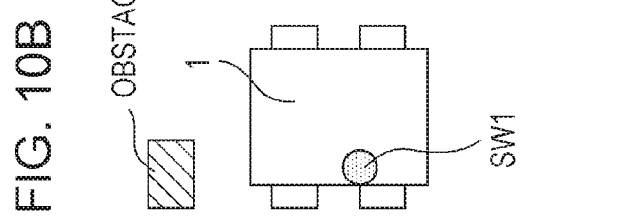
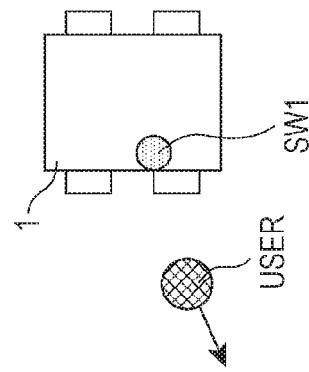
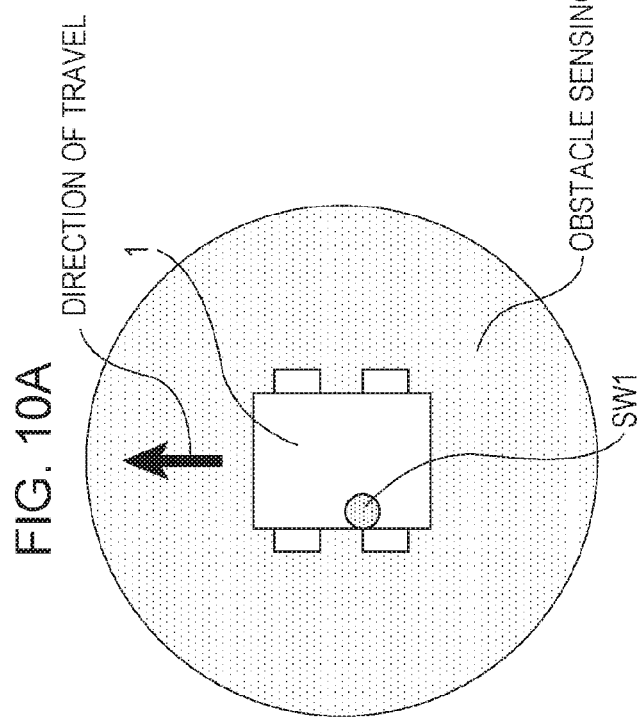
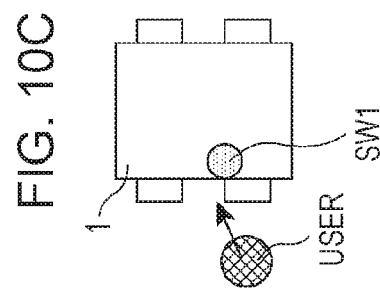

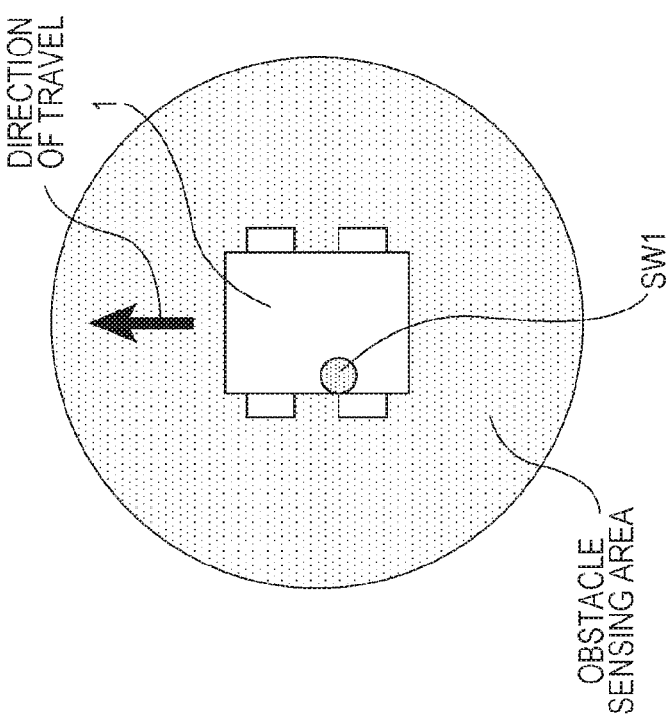
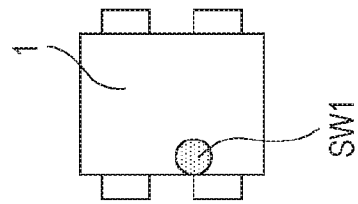
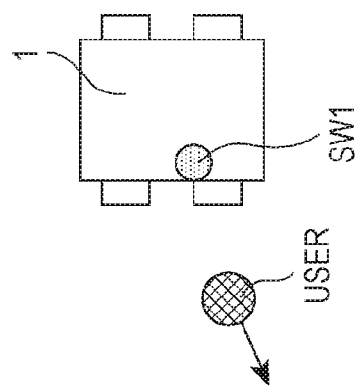

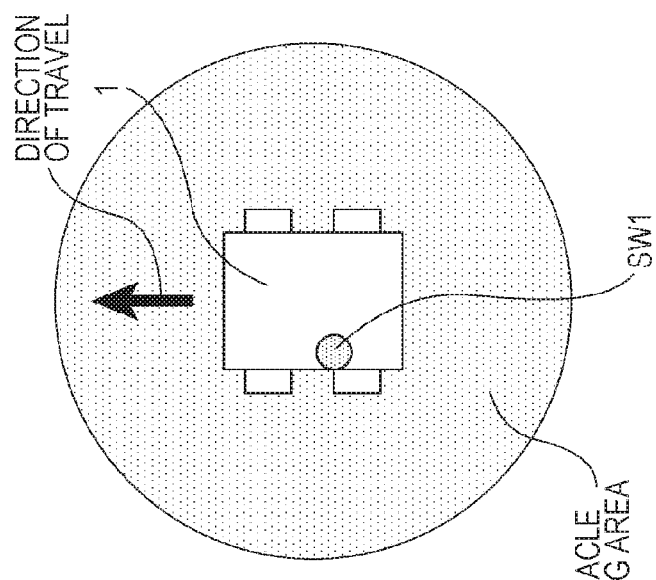
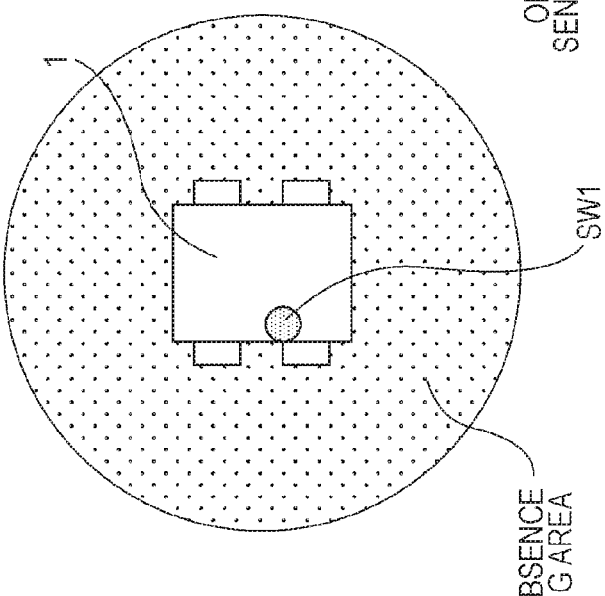
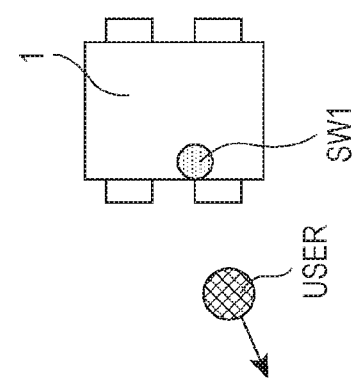

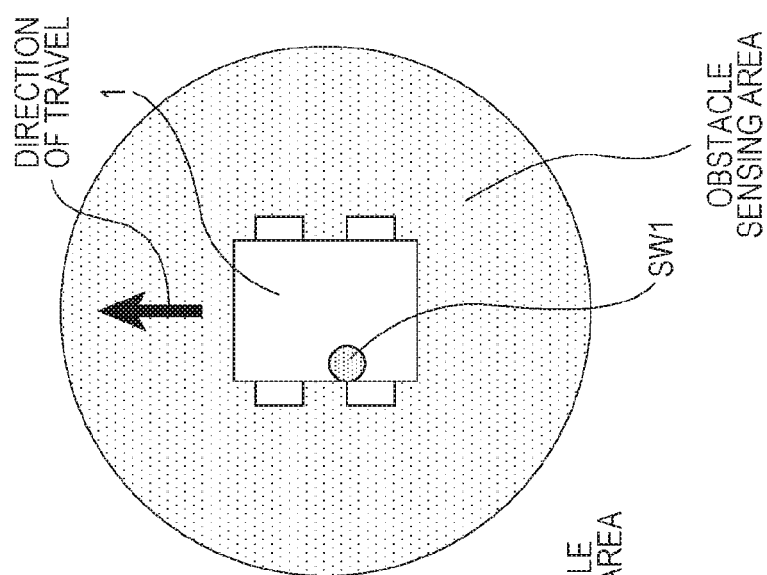
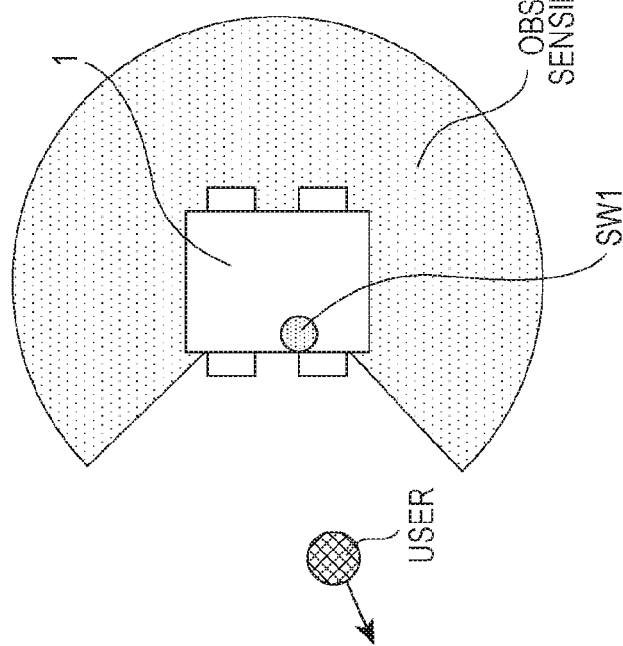
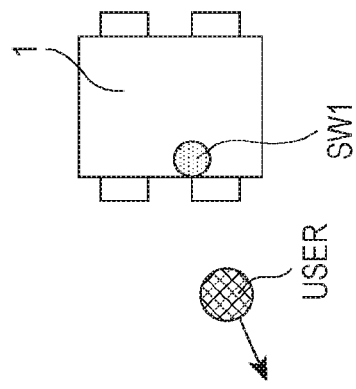

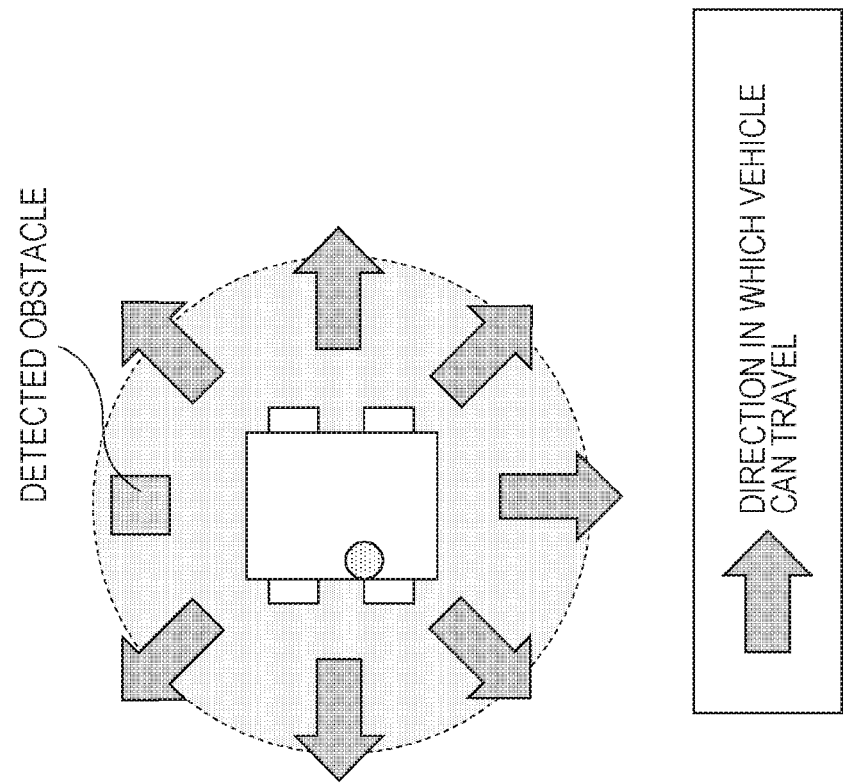
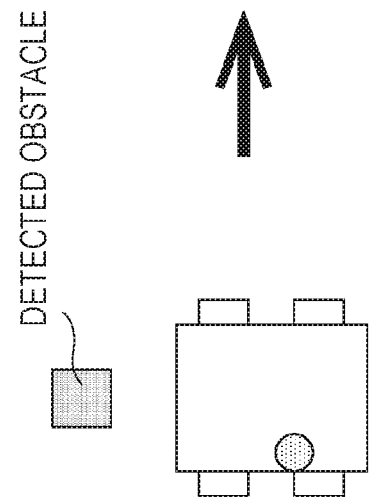

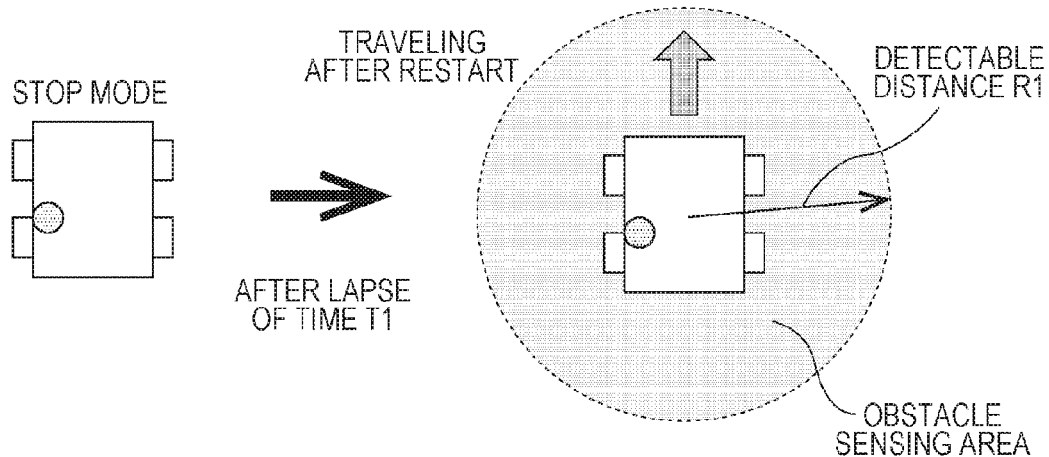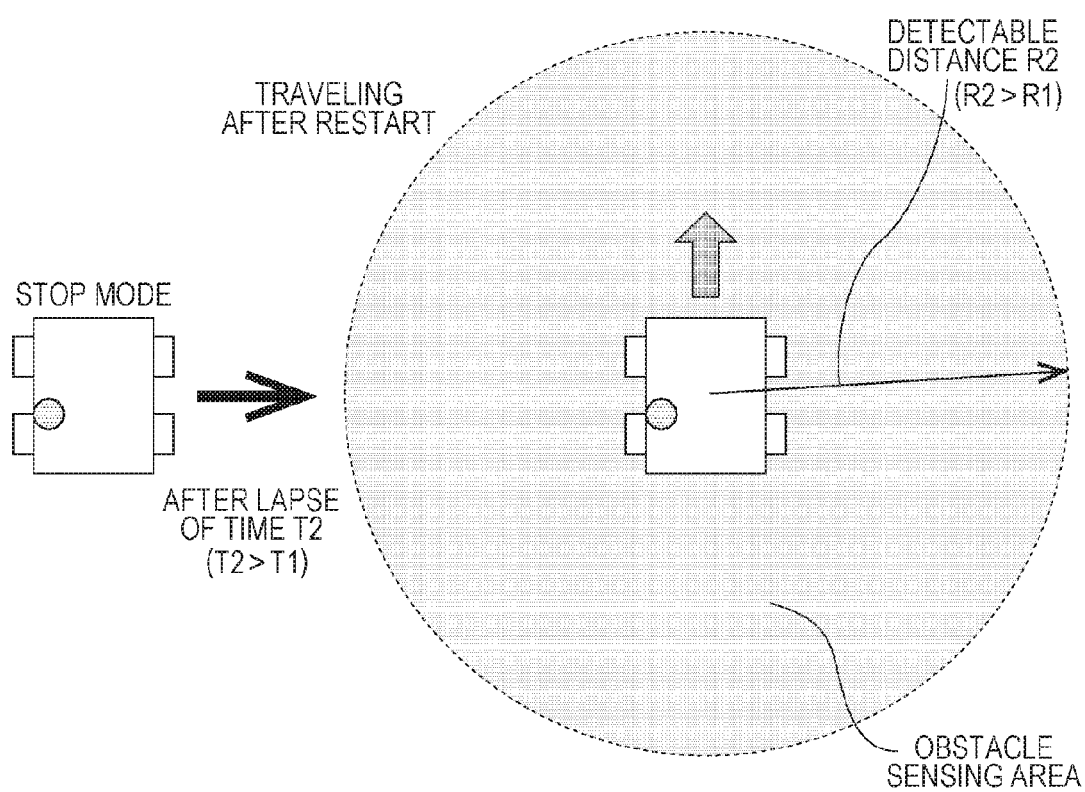

AUTONOMOUS TRAVELING APPARATUS

BACKGROUND

1. Field

The present disclosure relates to autonomous traveling apparatuses, and more specifically to an autonomous traveling apparatus having a function of measuring distance to an obstacle and including a restart switch for allowing the autonomous traveling apparatus to restart from a stop mode.

2. Description of the Related Art

Autonomous traveling apparatuses that move autonomously have been being used such as transport robots for transporting luggage from one place to another and surveillance robots for monitoring conditions in and around buildings or conditions in predetermined premises.

Such an autonomous traveling apparatus of the related art as described above stores in advance information on a map of an area where the autonomous traveling apparatus is scheduled to travel and information on a movement route, and uses information acquired from cameras, distance image sensors, and Global Positioning System (GPS) devices to travel along a predetermined route while avoiding obstacles.

Upon finding an obstacle on the route to travel autonomously, an autonomous traveling apparatus of the related art (hereinafter also referred to simply as a vehicle) performs a process of traveling with deceleration, changing the route, or stopping before collision with the obstacle.

To detect obstacles, for example, cameras or distance sensors for emitting laser light and detecting reflected light from objects are used.

In some cases, when an autonomous traveling apparatus stops, a person in charge at a remote location checks the surroundings of the vehicle by using cameras or the like while at the remote location and then transmits a restart signal by remote control to automatically restart the autonomous traveling apparatus.

Japanese Unexamined Patent Application Publication No. 2005-176622 proposes an agricultural vehicle with autonomous traveling capability. The agricultural vehicle includes an obstacle detector in a front portion thereof, which is constituted by a distance sensor for detecting distance to an obstacle, to prevent interference (collision or contact) with an obstacle on cultivated land to prevent damage to the obstacle and the body of the agricultural vehicle during operation. The agricultural vehicle is configured to stop autonomous travel when the distance to an obstacle is less than or equal to a predetermined set distance. If autonomous traveling of the agricultural vehicle is stopped, the operator approaches the vicinity of the agricultural vehicle to find out the cause of the stoppage. After eliminating the cause, the operator operates a restart switch on the body of the agricultural vehicle.

However, when an autonomous traveling apparatus of the related art stops due to an obstacle or the like and is then restarted by remote control, the autonomous traveling apparatus may collide with the obstacle or the like unless the obstacle or the like, which is the cause of the stoppage, is removed. In this case, the autonomous traveling apparatus may encounter a problem when traveling after a restart.

Accordingly, an autonomous traveling apparatus which has stopped may be in a dangerous situation. Thus, it is desirable that the user, or the operator, check the vehicle for safety and restart the vehicle.

As in Japanese Unexamined Patent Application Publication No. 2005-176622, when the operator operates the restart switch on the body of the agricultural vehicle, immediate startup of obstacle detection and resumption of autonomous traveling of the agricultural vehicle may cause the operator, who has operated the restart switch, to be detected as an obstacle since the operator is still near the body of the agricultural vehicle immediately after the restart switch has been activated, and may cause the agricultural vehicle to stop again.

SUMMARY

Accordingly, the present disclosure provides an autonomous traveling apparatus configured to prevent a user who has operated a restart switch from being detected as an obstacle and to safely resume traveling autonomously after a restart.

According to an aspect of the disclosure, there is provided an autonomous traveling apparatus including a body, a travel control unit, an obstacle detection unit, a restart switch, and a restart control unit. The travel control unit controls a drive member to cause the autonomous traveling apparatus to travel. The obstacle detection unit detects an object located within a predetermined obstacle sensing area. The restart switch is disposed on the body and is operable to cause the autonomous traveling apparatus to resume traveling from a stop mode. When an operation of activating the restart switch is performed by a user, the restart control unit causes the obstacle detection unit to resume obstacle detection so as not to detect the user as an obstacle until the user who has performed the operation of activating the restart switch moves out of the obstacle sensing area, and causes the autonomous traveling apparatus to resume traveling.

According to another aspect of the disclosure, there is provided a method for restarting an autonomous traveling apparatus. The autonomous traveling apparatus includes a body, a travel control unit that controls a drive member to cause the autonomous traveling apparatus to travel, an obstacle detection unit that detects an object located within a predetermined obstacle sensing area, a restart switch disposed on the body and operable to cause the autonomous traveling apparatus to resume traveling from a stop mode, and a restart control unit. The method includes, by the restart control unit, detecting whether a user has performed an operation of activating the restart switch, detecting, in response to detection of the operation of activating the restart switch, whether the user who has performed the operation of activating the restart switch has moved out of the obstacle sensing area, causing the obstacle detection unit to resume obstacle detection so as not to detect the user as an obstacle until movement of the user out of the obstacle sensing area is detected, and causing the travel control unit to resume traveling of the autonomous traveling apparatus.

According to still another aspect of the disclosure, there is provided a non-transitory computer readable medium storing a program for causing a computer to execute a process. The process includes controlling a drive member to cause a vehicle to travel, detecting an object located within a predetermined obstacle sensing area, detecting activation of a restart switch that is disposed on a body of the vehicle and operable to cause the vehicle to resume traveling from a stop mode, and, in response to detection of an operation of activating the restart switch by a user, resuming obstacle detection so as not to detect the user as an obstacle until the user who has performed the operation of activating the restart switch moves out of the obstacle sensing area, and causing the vehicle to resume traveling.

The program may be provided in various forms. For example, the program may be stored in a computer-readable storage medium or may be downloaded from an external server or the like via a network such as the Internet and stored in a rewritable non-volatile storage medium.

BRIEF DESCRIPTION OF THE DRAWINGS

FIGS. 10A to 10D are schematic diagrams illustrating how the autonomous traveling apparatus which is normally traveling stops upon detection of an obstacle and the user presses a restart switch and then moves away from the autonomous traveling apparatus;

FIGS. 11A to 11C are schematic diagrams illustrating how the user, after pressing the restart switch, moves away from the autonomous traveling apparatus and the autonomous traveling apparatus starts traveling according to a first embodiment;

FIGS. 12A to 12C are schematic diagrams illustrating how the user, after pressing the restart switch, moves away from the autonomous traveling apparatus and the autonomous traveling apparatus starts traveling according to a second embodiment;

FIGS. 14A to 14C are schematic diagrams illustrating how the user, after pressing the restart switch, moves away from the autonomous traveling apparatus and the autonomous traveling apparatus starts traveling according to a fourth embodiment;

FIGS. 16A and 16B are schematic diagrams illustrating an example that enables avoidance of a detected obstacle after an obstacle detection function has been resumed; and FIGS. 17A and 17B are schematic diagrams illustrating an example in which, after an obstacle detection function has been resumed, different recovery waiting times are set if an obstacle is detectable over different distances.

DESCRIPTION OF THE EMBODIMENTS

Embodiments of the present disclosure will now be described with reference to the drawings. It is to be understood that the present disclosure is not limited to the following embodiments and examples.

Configuration of Autonomous Traveling Apparatus

Figure 1:
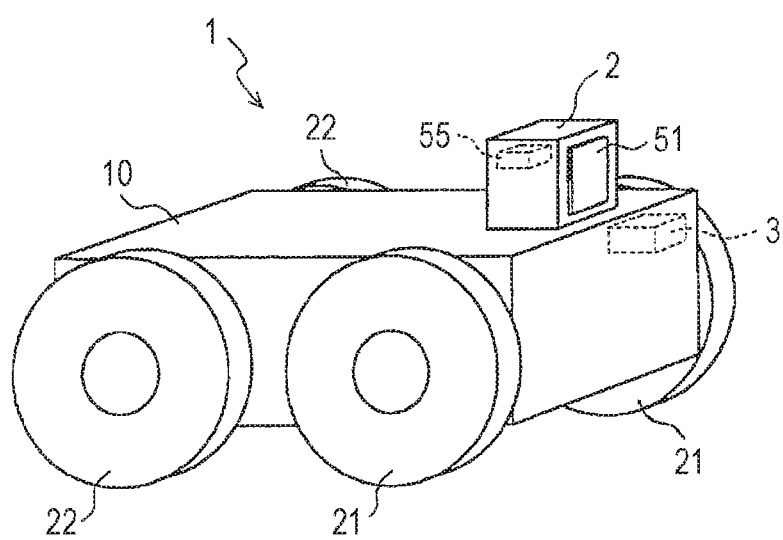
FIG. 1 is an external view of an example of an autonomous traveling apparatus according to embodiments of the present disclosure.

FIG. 1 is an external view of an example of an autonomous traveling apparatus according to embodiments of the present disclosure.

In FIG. 1, an autonomous traveling apparatus 1 according to embodiments of the present disclosure is a vehicle having a function of moving autonomously while avoiding obstacles on the basis of predetermined route information.

The autonomous traveling apparatus 1 may also have various functions, such as a transportation function, a monitoring function, a cleaning function, a navigation function, and a notification function, in addition to the movement function.

The following examples mainly provide an autonomous traveling apparatus that is capable of traveling autonomously within a predetermined outdoor monitoring area or along a predetermined outdoor passage to monitor the monitoring area or the like or transport an object from one place to another.

Referring to the external view in FIG. 1, the autonomous traveling apparatus 1 (hereinafter also referred to as the vehicle 1) mainly includes a body 10, four wheels (21 and 22), a monitoring device 2, and a control device 3.

The monitoring device 2 has a function of checking the conditions of an area within which the vehicle 1 is to move or the conditions of the surface of the road on which the vehicle 1 is traveling or a function of monitoring a target of surveillance. For example, the monitoring device 2 includes a distance detection unit 51 that checks the conditions of a space ahead in the direction of movement, a camera (imaging unit) 55, and a position information acquisition unit 58 (described below) that acquires information on the current position of the vehicle 1 that is traveling.

The control device 3 executes functions of the autonomous traveling apparatus 1 according to the embodiments of the present disclosure, such as the traveling function and the monitoring function. For example, the control device 3 includes a control unit 50, an image recognition unit 56, an obstacle detection unit 57, a communication unit 54, and a storage unit 70, which will be described below.

The autonomous traveling apparatus 1 according to the embodiments of the present disclosure travels autonomously while checking conditions ahead of, beside, and behind the body 10 in the direction of travel by using the camera 55, the distance detection unit 51, and the obstacle detection unit 57, for example. For instance, upon detecting an obstacle, a step, or the like ahead, the vehicle 1 performs operations such as stopping, turning, or driving backward or forward to change the direction to prevent a collision with the obstacle or the like. Upon recognizing an obstacle through image recognition or detecting a contact with an obstacle, the vehicle 1 performs a predetermined function such as stopping.

Figure 2A:
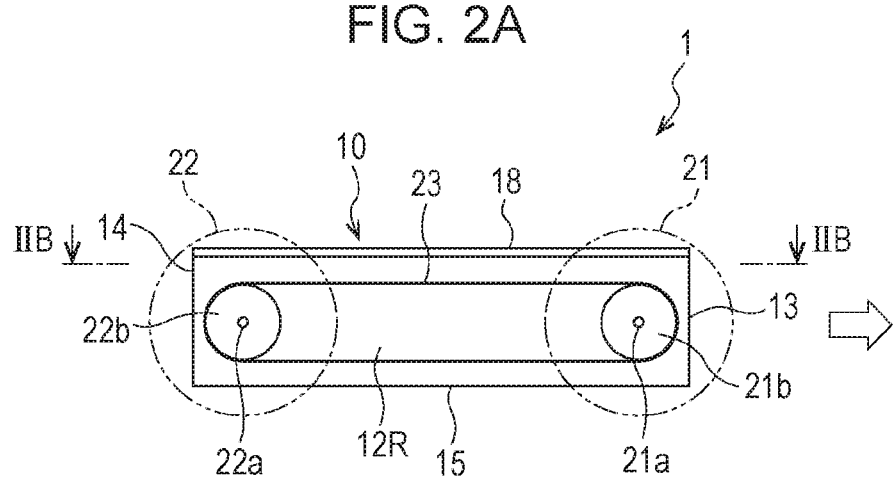
FIGS. 2A and 2B are diagrams illustrating a configuration related to traveling of the autonomous traveling apparatus according to the embodiments of the present disclosure.
Figure 2B:
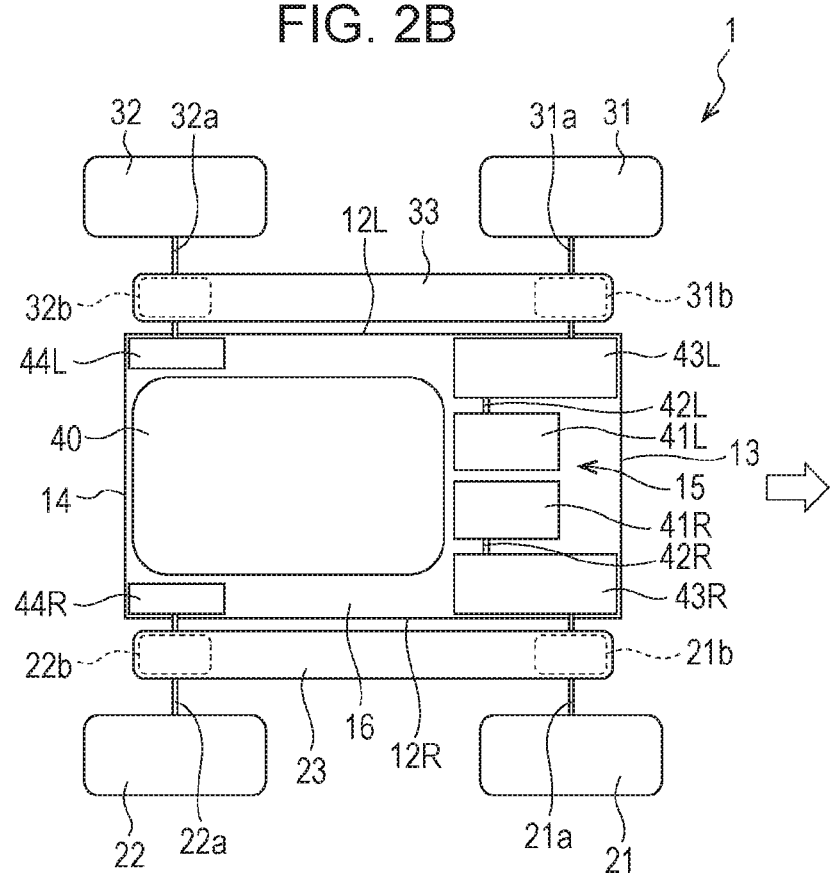

FIGS. 2A and 2B illustrate a configuration related to traveling of the autonomous traveling apparatus 1 according to the embodiments of the present disclosure.

FIG. 2A is a right side view of the vehicle 1, and the right front wheel 21 and the right rear wheel 22 are indicated by imaginary lines. FIG. 2B is a cross-sectional view taken along arrowed line IIB-IIB of FIG. 2A, and sprockets 21b, 22b, 31b, and 32b described below are indicated by imaginary lines. The front wheels (21 and 31) are disposed in a front portion 13 of the body 10, and the rear wheels (22 and 32) are disposed in a rear portion 14 of the body 10.

The body 10 has a strip-shaped cover 18 on each of side surfaces 12R and 12L thereof, and the covers 18 extend in the forward/backward direction of the body 10. Below the covers 18, axle shafts 21a and 31a that rotatably support the front wheels 21 and 31, respectively, and axle shafts 22a and 32a that rotatably support the rear wheels 22 and 32, respectively, are disposed. The axle shafts 21a, 31a, 22a, and 32a are independently rotatable unless they are coupled using power transmission members.

Belts 23 and 33 serving as power transmission members are disposed around the pair of right front and rear wheels (21 and 22) and the pair of left front and rear wheels (31 and 32), respectively. Specifically, the axle shaft 21a of the right front wheel 21 is provided with the sprocket 21b, and the axle shaft 22a of the right rear wheel 22 is provided with the sprocket 22b. The belt 23 is wrapped around the sprocket 21b for the front wheel 21 and the sprocket 22b for the rear wheel 22 in such a manner that, for example, projections on the inner side of the belt 23 are engaged with the teeth of the sprockets 21b and 22b. Likewise, the axle shaft 31a of the left front wheel 31 is provided with the sprocket 31b, and the axle shaft 32a of the left rear wheel 32 is provided with the sprocket 32b. The belt 33 having a structure similar to that of the belt 23 is wrapped around the sprocket 31b for the front wheel 31 and the sprocket 32b for the rear wheel 32.

Since the pair of right front and rear wheels (21 and 22) and the pair of left front and rear wheels (31 and 32) are coupled and driven using the respective belts (23 and 33), it is only required to drive one of the wheels in each pair. For example, it is only required to drive the front wheels (21 and 31). When one of the wheels in each pair is a drive wheel, the other wheel serves as a driven wheel that is driven by the corresponding belt serving as a power transmission member without slippage.

Examples of the power transmission member used to couple and drive the pair of front and rear wheels on each of the left and right sides include, in addition to sprockets and a belt having projections engaged with the sprockets, sprockets and a chain engaged with the sprockets. If slippage is allowable, high-friction pulleys and a belt may be used as a power transmission member. In this case, the power transmission member is configured such that each drive wheel and each driven wheel have an equal rotational speed.

In FIGS. 2A and 2B, the front wheels (21 and 31) are drive wheels and the rear wheels (22 and 32) are driven wheels.

The body 10 has two motors on a bottom surface 15 thereof in a portion near the front wheels 21 and 31, namely, an electric motor 41R for driving the right front and rear wheels 21 and 22 and an electric motor 41L for driving the left front and rear wheels 31 and 32. A gearbox 43R serving as a power transmission mechanism is disposed between a motor shaft 42R of the right electric motor 41R and the axle shaft 21a of the right front wheel 21. Likewise, a gearbox 43L serving as a power transmission mechanism is disposed between a motor shaft 42L of the left electric motor 41L and the axle shaft 31a of the left front wheel 31. Here, the two electric motors 41R and 41L are arranged side-by-side so as to be symmetric about the centerline of the body 10 in the direction of travel, and the gearboxes 43R and 43L are disposed to the right and left of the electric motors 41R and 41L, respectively.

Each of the gearboxes 43R and 43L is an assembly constituted by gears, shafts, and so on and configured to transmit the power from the corresponding one of the electric motors 41R and 41L to the corresponding one of the axle shafts 21a and 31a, which are output shafts, by changing the torque, the rotational speed, or the direction of rotation, and may include a clutch to switch between power transmission and power interruption. The right rear wheel 22 and the left rear wheel 32 are pivotably supported on bearings 44R and 44L, respectively. The bearings 44R and 44L are disposed on the bottom surface 15 of the body 10 in the vicinity of the right side surface 12R and the left side surface 12L, respectively.

The configuration described above enables the pair of right front and rear wheels 21 and 22 and the pair of left front and rear wheels 31 and 32 in the direction of travel to be driven independently. That is, the power of the right electric motor 41R is transferred to the gearbox 43R via the motor shaft 42R and is transmitted to the axle shaft 21a after the rotational speed, the torque, or the direction of rotation has been converted by the gearbox 43R. In response to a rotation of the axle shaft 21a, the wheel 21 rotates, and the rotation of the axle shaft 21a is transmitted to the rear wheel 22 through the sprocket 21b, the belt 23, and the sprocket 22b to cause the rear wheel 22 to rotate. The transmission of power from the left electric motor 41L to the front wheel 31 and the rear wheel 32 is similar to that on the right side described above.

When the two electric motors 41R and 41L have the same rotational speed, the respective gear ratios (reduction ratios) of the gearboxes 43R and 43L are made equal to drive the autonomous traveling apparatus 1 forward or backward. In order to change the speed of the autonomous traveling apparatus 1, the respective gear ratios of the gearboxes 43R and 43L are changed with the values of the gear ratios kept equal.

In order to change the direction of travel, the respective gear ratios of the gearboxes 43R and 43L are changed so that the rotational speed of the right front wheel 21 and the right rear wheel 22 and the rotational speed of the left front wheel 31 and the left rear wheel 32 are made different. Further, the directions of rotation of the outputs of the gearboxes 43R and 43L are made different, thereby making the right wheels 21 and 22 and the left wheels 31 and 32 rotate in opposite directions. This enables the autonomous traveling apparatus 1 to turn on the spot centered on the center of the body 10.

To turn the autonomous traveling apparatus 1 on the spot, higher resistance is applied to the wheels 21, 22, 31, and 32 for a larger distance between the front wheels 21 and 31 and the rear wheels 22 and 32 (for a greater wheelbase) because of no steering mechanism to make the angles of the front wheels 21 and 31 and the rear wheels 22 and 32 variable, and a higher drive torque is required to turn the autonomous traveling apparatus 1. The respective gear ratios of the gearboxes 43R and 43L are variable, which enables a high torque to be applied to the wheels 21, 22, 31, and 32 by reducing the rotational speed of the wheels 21, 22, 31, and 32 at the time of turning.

For example, the gear ratio of the gearbox 43R is set such that the number of teeth of a gear near the motor shaft 42R is 10, the number of teeth of an intermediate gear is 20, and the number of teeth of a gear near the axle shaft 21b is 40.

In this case, the rotational speed of the axle shaft 21b is equal to one quarter the rotational speed of the motor shaft 42R; a torque that is four times that of the motor shaft 42R is obtained. A higher torque can be obtained by selecting a gear ratio so as to further reduce the rotational speed. This enables the autonomous traveling apparatus 1 to turn even on a road such as a rough or sandy road on which the wheels 21, 22, 31, and 32 have high resistance.

Since the gearboxes 43R and 43L are disposed between the motor shafts 42R and 42L and the axle shafts 21a and 31a, respectively, vibration from the wheels 21 and 31 is not transmitted directly to the motor shafts 42R and 42L. It is desirable that the gearboxes 43R and 43L be provided with a clutch for transmitting and shutting off (interrupting) power such that when the electric motors 41R and 41L are not energized, power transmission between the electric motors 41R and 41L and the axle shafts 21a and 31a, which serve as drive shafts, is interrupted. Thus, if a certain amount of force applied to the body 10 causes the wheels 21, 22, 31, and 32 to rotate while the autonomous traveling apparatus 1 is stopped, the rotation of the wheels 21, 22, 31, and 32 is not transmitted to the electric motors 41R and 41L. As a result, no counter-electromotive force is generated in the electric motors 41R and 41L and no damage may occur to the circuit of the electric motors 41R and 41L.

Accordingly, the pair of right front and rear wheels and the pair of left front and rear wheels are coupled using respective power transmission members and are driven by two electric motors arranged near the front wheels to drive the four wheels. Thus, no dedicated electric motors are used for the rear wheels or no dedicated gearboxes are used for the rear wheels between the electric motors and the rear wheels. As a result, the space for such dedicated electric motors and gearboxes for the rear wheels may be reduced.

As described above, the two electric motors 41R and 41L are arranged on the bottom surface 15 of the body 10 near the front wheels 21 and 31 in the right and left portions in the direction of travel, respectively, and the gearboxes 43R and 43L are arranged to the right and left of the electric motors 41R and 41L, respectively. In contrast, the bearings 44R and 44L are merely arranged on the bottom surface 15 near the rear wheels 22 and 32. This can ensure a large space 16 on the bottom surface 15 of the body 10, extending from the center position of the body 10 to, for example, the rear edge of the body 10.

The electric motors 41R and 41L use a battery (rechargeable battery) 40, such as a lithium ion battery, as a power source, and the battery 40 is accommodated in the space 16. Specifically, the battery 40 has a substantially rectangular parallelepiped profile, for example, and can be mounted at substantially the center position on the bottom surface 15 in the manner illustrated in FIG. 2B. The rear portion 14 of the body 10 is desirably to be openable and closable with respect to an upper surface or the bottom surface 15, for example, to facilitate insertion and removal of the battery 40 into and from the space 16. Accordingly, the battery 40 having a capacity large enough to drive the autonomous traveling apparatus 1 for a long time can be mounted in the space 16 of the body 10. In addition, operations such as replacement, charging, and checkup of the battery 40 are feasible by accessing the rear portion 14. Additionally, the battery 40 can be arranged on the bottom surface 15, thereby achieving an electric powered vehicle with the center of gravity lowered and capable of traveling stably.

Figure 3:
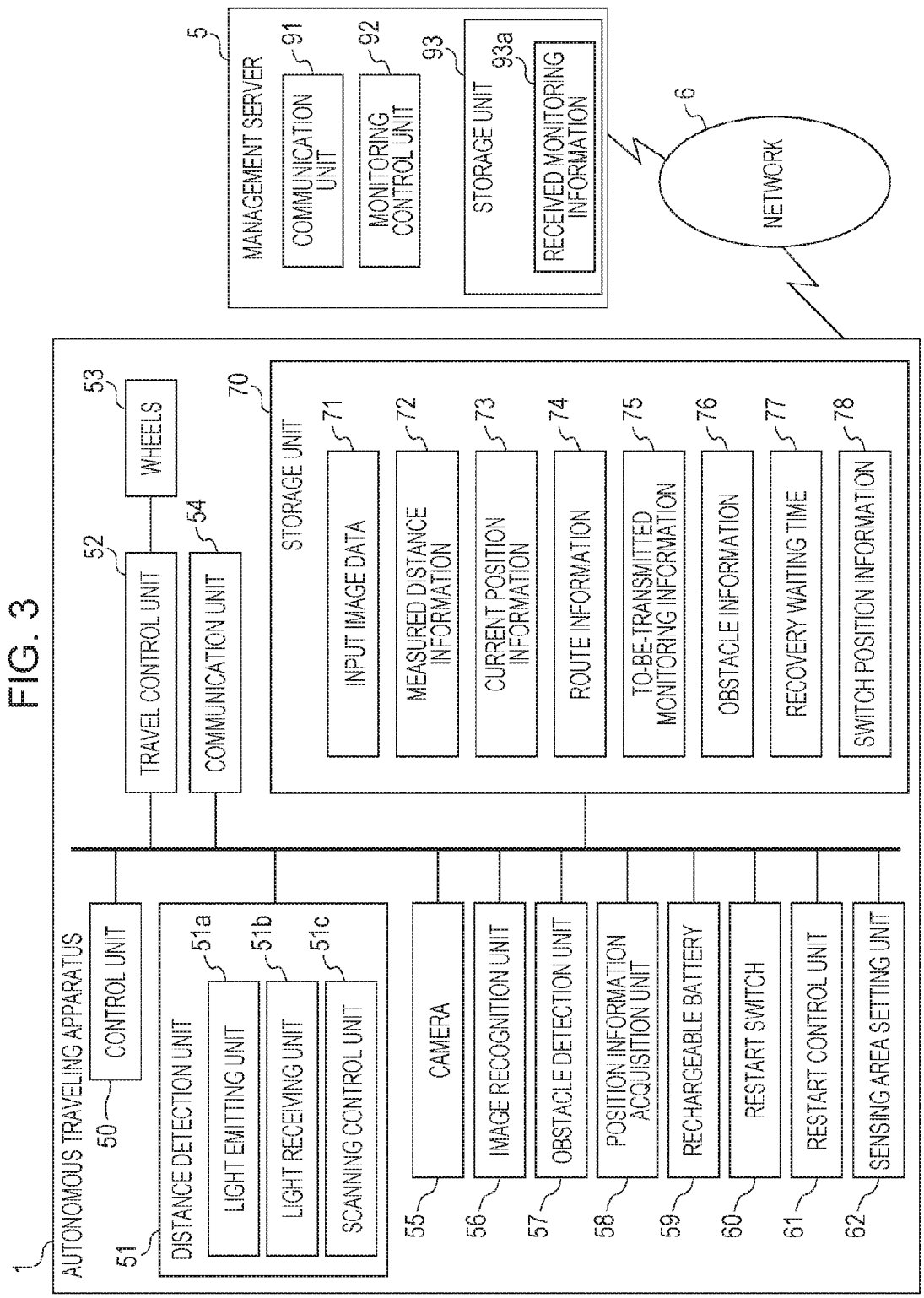
FIG. 3 is a configuration block diagram of an example of the autonomous traveling apparatus according to the embodiments of the present disclosure.

FIG. 3 is a configuration block diagram of an example of the autonomous traveling apparatus according to the embodiments of the present disclosure.

In FIG. 3, the autonomous traveling apparatus 1 according to the embodiments of the present disclosure mainly includes a control unit 50, the distance detection unit 51, a travel control unit 52, wheels 53, a communication unit 54, the camera 55, an image recognition unit 56, an obstacle detection unit 57, a position information acquisition unit 58, a rechargeable battery 59, a restart switch 60, a restart control unit 61, a sensing area setting unit 62, and a storage unit 70.

Further, the autonomous traveling apparatus 1 is connected to a management server 5 via a network 6, travels autonomously on the basis of instruction information or the like sent from the management server 5, and transmits acquired monitoring information and the like to the management server 5.

The network 6 may be any currently available network. Desirably, the network 6 is a network capable of wireless communication (for example, a wireless local area network (LAN)) since the autonomous traveling apparatus 1 is a mobile apparatus.

Examples of the network for wireless communication include the Internet, which is publicly available, and a wireless network with dedicated lines accessible to limited devices. Examples of the scheme for wireless transmission over wireless communication paths include schemes complying with standards such as wireless LAN (regardless of whether WiFi (registered trademark) authentication is required or not), ZigBee (registered trademark), and Bluetooth (registered trademark) Low Energy (LE), and any of them may be used in consideration of the radio arrival distance, the transmission band, and the like. For example, a mobile telephone network or the like may be used.

The management server 5 mainly includes a communication unit 91, a monitoring control unit 92, and a storage unit 93.

The communication unit 91 communicates with the autonomous traveling apparatus 1 via the network 6 and desirably has a wireless communication function.

The monitoring control unit 92 controls movement of the autonomous traveling apparatus 1 and executes functions such as collecting information on the autonomous traveling apparatus 1 and monitoring the autonomous traveling apparatus 1.

The storage unit 93 stores information for instructing the autonomous traveling apparatus 1 to move, monitoring information (received monitoring information 93a) sent from the autonomous traveling apparatus 1, a program for monitoring control, and so on.

The control unit 50 of the autonomous traveling apparatus 1 controls the operations of the constituent components such as the travel control unit 52 and is implemented using mainly a microcomputer including a central processing unit (CPU), a read-only memory (ROM), a random access memory (RAM), an input/output (I/O) controller, a timer, and so on.

The CPU causes various hardware components to organically operate in accordance with a control program stored in advance in the ROM or the like to execute a traveling function, an image recognition function, an obstacle detection function, and so on according to the embodiments of the present disclosure.

The distance detection unit 51 detects distance to an object and a road surface located in a predetermined space (for example, within an obstacle sensing area) including a space ahead of the current position of the vehicle 1 in the direction of travel. The distance detection unit 51 is arranged at substantially the center in the front portion 13 of the body 10. The object may be, for example, a building, a post, a wall, or a protrusion when the vehicle 1 is traveling outdoors.

For instance, the distance detection unit 51 emits predetermined light to the obstacle sensing area and then receives light reflected by an object and a road surface located within the obstacle sensing area to detect distance to the object and road surface.

Specifically, the distance detection unit 51 is constituted by mainly a light emitting unit 51a that emits light to a predetermined area in the direction of travel, a light receiving unit 51b that receives light reflected by an object, and a scanning control unit 51c that two-dimensionally or three-dimensionally changes the direction of emission of light.

Figure 4:
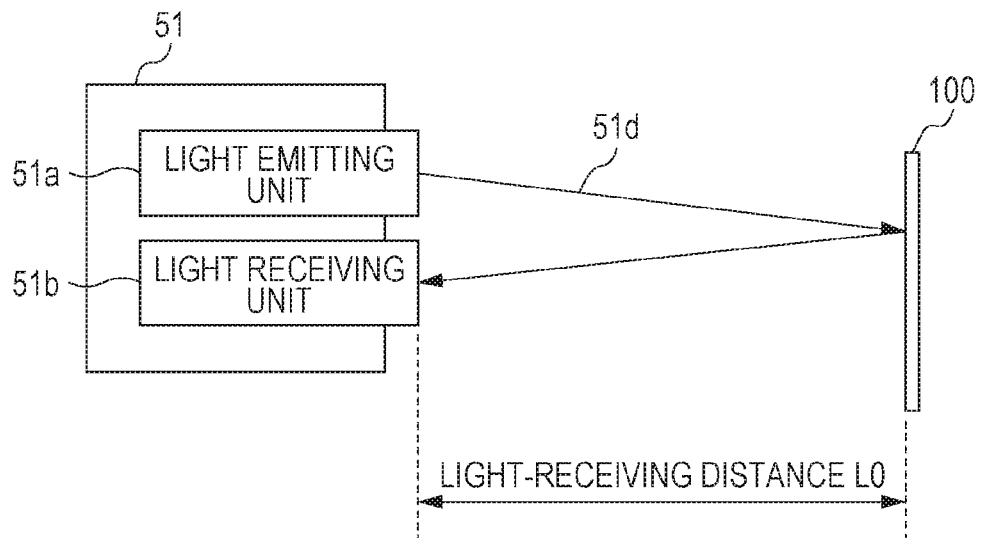
FIG. 4 is a schematic diagram illustrating an example of a distance detection unit according to the embodiments of the present disclosure.

FIG. 4 illustrates an example of the distance detection unit 51 according to the embodiments of the present disclosure.

In FIG. 4, laser light 51d emitted from the light emitting unit 51a is reflected by an object 100, and a portion of the laser light 51d that returns from the object 100 over a light-receiving distance L0 is received by the light receiving unit 51b.

Examples of the light to be emitted include laser light, infrared radiation, visible light, an ultrasonic wave, and an electromagnetic wave. Laser light is desirably used because it is desirable to ensure distance measurement during night hours.

Light Detection and Ranging or Laser Imaging Detection and Ranging (LIDAR) devices are currently available as distance detection sensors. A LIDAR device may be used as the distance detection unit 51.

A LIDAR device is a device that emits laser light to a two-dimensional space or a three-dimensional space within a predetermined obstacle sensing area to measure distances to a plurality of measurement points within the obstacle sensing area. Measurement of a distance to a measurement point in a two-dimensional space in the horizontal direction is referred to as 2D LIDAR, and measurement of a distance to a measurement point in a three-dimensional space in the horizontal direction and the vertical direction is referred to as 3D LIDAR.

In LIDAR, after laser light is emitted from the light emitting unit 51a, light reflected by an object is detected by the light receiving unit 51b to calculate the light-receiving distance L0 from, for example, the time difference between the time of light emission and the time of light reception. The light-receiving distance L0 corresponds to measured distance information 72 described below.

The laser light emitted from the light emitting unit 51a impinges on a stationary object that is a distance L0 away from the light emitting unit 51a. In this case, the light travels a distance (2L0) that is twice the distance L0 from the leading end of the light emitting unit 51a to the surface of the object and is then received by the light receiving unit 51b.

The time of emission of laser light and the time of reception of laser light deviate from each other by an amount corresponding to the time T0 taken for the laser light to travel the distance (2L0) described above. In other words, a time difference T0 occurs. The time difference T0 and the velocity of the light can be utilized to calculate the light-receiving distance L0.

The distance to the object (obstacle) is further detected based on the calculated light-receiving distance L0.

In FIG. 4, the distance detection unit 51 does not move and the laser light emitted from the light emitting unit 51a travels along the same optical path.

Thus, when light impinges on a point on the object 100 and light reflected from the point is received, only the distance between the leading end of the light emitting unit 51a and the point on the object 100 is calculated.

The scanning control unit 51c mainly scans the direction of light emission so that light can be emitted toward a plurality of predetermined measurement points within an obstacle detection area in a space ahead in the direction of travel. The scanning control unit 51c slightly changes the orientation of the distance detection unit 51 at certain time intervals to slightly change the optical path along which the emitted laser light travels.

In 2D LIDAR, the LIDAR device 51 changes the direction of laser emission by a predetermined scanning pitch within a predetermined two-dimensional space in the horizontal direction to calculate distance to an object (horizontal two-dimensional scanning). For a three-dimensional calculation of a distance to an object using 3D LIDAR, the LIDAR device 51 vertically changes the direction of laser emission by a predetermined scanning pitch and further performs horizontal two-dimensional scanning in the way described above to calculate distance.

Figure 5:
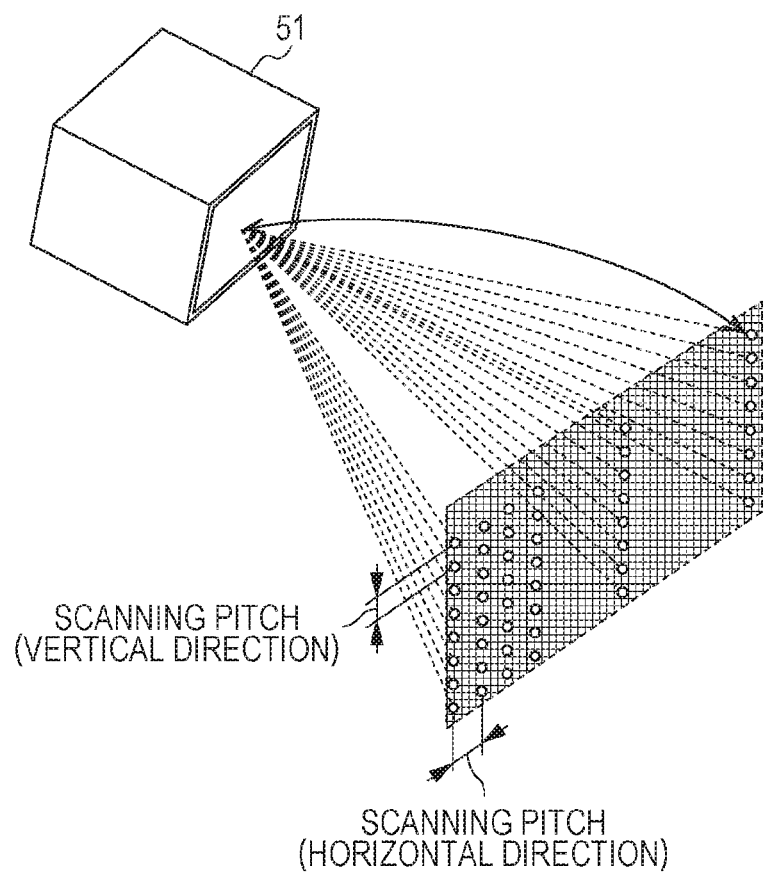
FIG. 5 is a schematic diagram illustrating the scanning direction of laser light emitted from the distance detection unit according to the embodiments of the present disclosure.

FIG. 5 schematically illustrates the scanning direction of the laser light emitted from the distance detection unit (LIDAR device) 51.

Figure 6A:
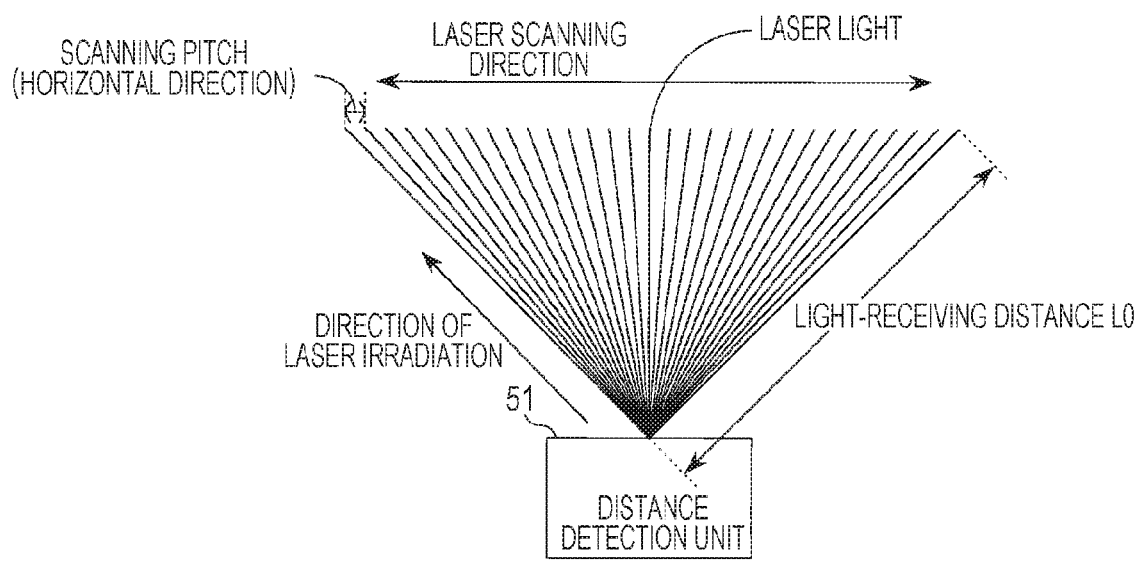
FIGS. 6A and 6B are schematic diagrams illustrating an area irradiated with the laser light, as viewed from above and behind, respectively, according to the embodiments of the present disclosure.
Figure 6B:
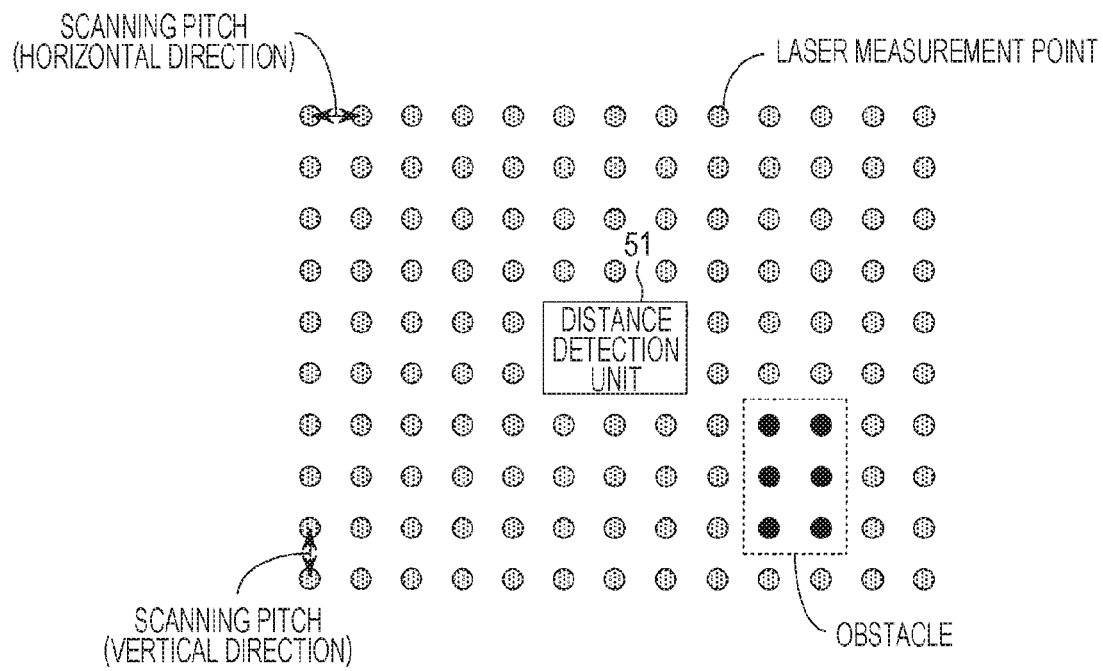

FIGS. 6A and 6B illustrate an area irradiated with the laser light emitted from the distance detection unit (LIDAR device) 51, as viewed from above (FIG. 6A) and from behind (FIG. 6B).

In FIG. 5, a single dot represents a position (hereinafter also referred to as a measurement point) at which the laser light impinges on a two-dimensional vertical plane (a vertical plane) located at a position spaced away by a predetermined distance.

For example, the orientation of the distance detection unit 51 is changed so that the direction of the laser light emitted from the light emitting unit 51a of the distance detection unit 51 is horizontally displaced to the right by a predetermined scanning pitch, which allows the laser light to impinge on the vertical plane at an adjacent position (measurement point) that is horizontally shifted to the right by the corresponding scanning pitch.

If an object is located at this position on the vertical plane, a portion of the laser light that is reflected from the corresponding one of the measurement points is received by the light receiving unit 51b.

The direction of laser irradiation is horizontally shifted sequentially by a predetermined scanning pitch in the way described above, which allows a predetermined number of measurement points to be irradiated with the laser light. For each of the measurement points irradiated with the laser light, whether reflected light has been received is checked to calculate distance.

FIG. 6A illustrates an example in which the direction of laser irradiation is horizontally shifted by a scanning pitch to scan the laser light rightward or leftward (i.e., horizontally) in FIG. 6A.

For instance, the direction of laser irradiation is the rightmost one in FIG. 6A. In this case, if an object is located in this direction, reflected light from the object is received to calculate a light-receiving distance L0.

As illustrated in FIG. 5, if the laser light is scanned vertically, for example, the laser light is emitted in directions that are vertically shifted upward by a predetermined scanning pitch. In this case, the laser light impinges on the vertical plane at an adjacent position (measurement point) that is vertically shifted upward by the scanning pitch.

The direction of laser emission is vertically shifted upward by one scanning pitch and then, as illustrated in FIG. 6A, the direction of laser irradiation is shifted horizontally, which enables the laser light to be applied to the measurement point at a position shifted upward by one scanning pitch and horizontally shifted from the preceding measurement point.

Accordingly, horizontal laser scanning and vertical laser scanning are performed sequentially to apply laser light to a predetermined three-dimensional space, and, if an object is located in the three-dimensional space, the distance to the object is calculated.

When the light (laser light) emitted toward a plurality of measurement points is reflected by an object, if it is confirmed that the light reflected by the object is received by the light receiving unit 51*b*, a portion of the object is determined to be present at the position of a measurement point to which distance is calculated.

The object is located within an area including a plurality of measurement points at which portions of the object are determined to be present, and sensing information that distinguishes the shape of the object, the posture of a person, or the like is acquired from information on the area including the plurality of measurement points.

The sensing information, which is information that distinguishes a certain object, may be acquired by the distance detection unit 51 or may be acquired from image data of the object whose image is captured with the camera 55.

In the foregoing description, two-dimensional scanning is performed in such a manner that laser light is scanned horizontally, by way of example but not limitation. The direction in which laser light is emitted may be changed vertically.

The laser light is applied to a three-dimensional measurement space in such a manner that, after two-dimensional scanning is performed in the vertical direction, the direction of laser emission is horizontally shifted by a predetermined scanning pitch and two-dimensional scanning in the vertical direction is sequentially performed in a similar way.

FIG. 6B schematically illustrates measurement points irradiated with laser light in a three-dimensional space when the laser light is scanned both horizontally and vertically.

If no object is located in a direction toward a measurement point to which laser light is emitted, the laser light travels along the optical path and no reflected light is received, resulting in no distance measurement.

On the other hand, if reflected light of the laser light emitted toward a certain measurement point is received, a distance is calculated and an object is recognized to be located at a position spaced away by the calculated distance.

In FIG. 6B, reflected light from six measurement points in a lower right portion is detected, and an object (such as a person or an obstacle) is recognized to be located within an area including the six measurement points.

If a predetermined number of measurement points or more measurement points (for example, ten or more measurement points) to which distances are measured are detected in an object detection area including a plurality of measurement points, an object is determined to be located within an area including the detected measurement points.

However, for instance, if the number of measurement points to which distances have been measured is less than a predetermined number or the measurement of distances at certain measurement points neighboring a measurement point to which distance has been measured is not successful, it is probable that no object will be located around the measurement point(s) and the distance measured at the measurement point(s) is determined to be erroneous.

In principle, when the number of measurement points to which distances have been measured is counted, a single measurement point is counted as one. For example, when distances have been measured at ten measurement points within a predetermined detection area, the number of measurement points within the area is counted as ten.

When the laser light 51*d* is incident on the light receiving unit 51*b* of the distance detection unit 51, an electrical signal corresponding to the intensity of the received laser light 51*d* is output.

The control unit 50 checks the electrical signal output from the light receiving unit 51*b*. For example, upon detection of an electrical signal having intensity greater than or equal to a predetermined threshold, the control unit 50 determines that laser light has been received.

The light emitting unit 51*a* includes an existing laser light emitting element, and the light receiving unit 51*b* includes a laser light receiving element that detects laser light.

Further, the control unit 50 uses the time difference T0 between the time of emission of laser light from the light emitting unit 51*a* and the time of reception of reflected light at the light receiving unit 51*b* to calculate a light-receiving distance L0 that is a distance between the light emitting unit 51*a* and each of a plurality of measurement points.

For instance, the control unit 50 acquires the current time by using a timer, calculates the time difference T0 between the time of laser emission and the time of light reception at which reception of laser light was confirmed, and calculates the light-receiving distance L0 by using the time difference T0 between the emission time and the reception time and also using the velocity of the laser light.

The travel control unit 52 controls a drive member that causes the autonomous traveling apparatus 1 to travel and mainly controls the rotation of the wheels 53 corresponding to the drive member to cause the autonomous traveling apparatus 1 to travel straight and turn, thereby achieving automatic traveling of the vehicle 1. Examples of the drive member include wheels and Caterpillar (registered trademark) tracks.

The wheels 53 correspond to the four wheels (21, 22, 31, and 32) illustrated in FIGS. 1, 2A, and 2B.

As described above, of the wheels, the right and left front wheels (21 and 31) may be drive wheels and the right and left rear wheels (22 and 32) may be driven wheels whose rotation is not controlled.

Alternatively, each of the right and left drive wheels (21 and 31) may be provided with an encoder (not illustrated) to measure the distance traveled by the vehicle 1 by using the rotational speeds, the directions of rotation, the positions of rotation, and the rates of rotation of the respective wheels, thereby controlling the travel of the vehicle 1. Each encoder corresponds to a speed detection unit.

The communication unit 54 transmits and receives data to and from the management server 5 via the network 6. As described above, the communication unit 54 desirably has a function of accessing the network 6 via wireless communication and communicating with the management server 5.

For example, a notification process is executed upon occurrence of an anomaly. In this case, the communication unit 54 transmits notification information indicating the occurrence of the anomaly and including the date and time when and the location where the anomaly occurred to the management server 5, which is located at a position different from that of the autonomous traveling apparatus 1.

The notification information may be transmitted to a terminal possessed by a person in charge at a position different from that of the autonomous traveling apparatus 1. The notification information may be transmitted to at least one or both of the management server 5 and the terminal.

The destination of the notification information needs to be set in advance. The destination may be changed or a further destination may be added, depending on how the vehicle 1 is driven, in accordance with anomalies or the like.

The camera 55 (imaging unit) mainly captures an image of a predetermined space including a space ahead of the vehicle 1 in the travel direction. Either a still image or a moving image may be captured. A captured image is stored in the storage unit 70 as input image data 71 and is transferred to the management server 5 in accordance with a request from the management server 5.

The vehicle 1 may include a plurality of cameras 55 instead of a single camera 55. For example, four cameras may be fixedly disposed to capture images of environments ahead of, to the left of, to the right of, and behind the vehicle 1. Additionally, each camera may be designed such that the direction in which the camera captures images can be changed or may have a zoom function.

When the vehicle 1 is traveling outdoors, images captured with the camera 55 in good weather and sufficiently bright conditions are analyzed to detect a person, an obstacle, road surface conditions, and so on.

The image recognition unit 56 recognizes an object in image data (the input image data 71) obtained by the camera 55. For instance, the image recognition unit 56 extracts an object included in image data and recognizes the extracted object as a person if the object has predetermined features of a person's body. The image recognition unit 56 further compares image data (person image) of a portion of the recognized person with information on registered persons which is stored in advance in the storage unit 70 to determine whether the person corresponding to the person image matches any of the persons registered in advance. The image recognition process may be based on an existing image recognition technique.

The object to be recognized is not limited to a person and may be an obstacle such as a wall, a post, a step, an animal, or a narrow passage.

The obstacle detection unit 57 detects an object located within a predetermined obstacle sensing area and mainly detects an object (such as an obstacle or a person) by using information acquired from the distance detection unit 51. In particular, the position of an object to which distance is detected by the distance detection unit 51 within the obstacle sensing area and the direction of the position at which the object is located with respect to the direction of travel may be detected.

For instance, the obstacle detection unit 57 detects the presence of an obstacle at a position corresponding to a measurement point from which reflected light has been received and to which distance has been calculated by the distance detection unit 51.

As described above, since distances to a plurality of measurement points are calculated, the size, position, and shape of an obstacle and the distance to the obstacle are acquired from position information of the measurement points to which distances are calculated.

Furthermore, the direction of laser irradiation at substantially the middle of the directions of laser irradiation in the laser scanning direction illustrated in FIG. 6A is assumed to be the direction of travel of the vehicle 1. In this case, whether the detected obstacle is located to the right or the left of the direction of travel or located exactly in the direction of travel can be determined from the relationship between the position of the measurement point at which the obstacle is detected and the scanning direction of laser light.

Furthermore, the direction in which an obstacle is located may be determined on the basis of the angle of the position at which the obstacle is located relative to zero degrees, where the direction of travel is set to zero degrees. That is, the direction in which the obstacle is located relative to the direction of travel can be detected.

The information on the detected obstacle is stored in the storage unit 70 as obstacle information 76. The obstacle information 76 is constantly acquired during the travel of the vehicle 1 and is updated at predetermined time intervals.

Examples of the obstacle detection unit 57 include, in addition to 2D LIDAR and 3D LIDAR devices corresponding to the distance detection unit 51, the camera 55 and ultrasonic sensors attached to a bumper or the like.

The position information acquisition unit 58 acquires information (such as the latitude and longitude) indicating the current position of the vehicle 1, and may acquire current position information 73 by using GPS, for example.

The acquired current position information 73 is compared with route information 74 stored in advance in the storage unit 70 to determine the direction in which the vehicle 1 is to travel, in accordance with which the vehicle 1 is caused to travel autonomously.

To realize autonomous traveling of the vehicle 1, it is desirable to use information obtained from all of the distance detection unit 51, the camera 55, the obstacle detection unit 57, and the position information acquisition unit 58, described above. However, information obtained from at least one of them may be used to realize autonomous traveling of the vehicle 1.

The position information acquisition unit 58 may employ any other currently available satellite navigation system other than GPS. Examples of the satellite navigation system include the Quasi-Zenith Satellite System (QZSS), which was developed by Japan, the Global Navigation Satellite System (GLONASS), which was developed by Russia, Galileo, which was developed by EU, the BeiDou Navigation Satellite System, which was developed by China, and the Indian Regional Navigational Satellite System (IRNSS), which was developed by India.

The rechargeable battery 59 supplies electric power to the functional components of the vehicle 1 and mainly supplies electric power to implement a traveling function, a distance detection function, an image recognition function, an obstacle detection function, and a communication function.

A rechargeable battery such as a lithium ion battery, a nickel-metal hydride battery, a nickel-cadmium (Ni—Cd) battery, a lead battery, or any fuel cell is used.

The autonomous traveling apparatus 1 may further include a remaining battery capacity detection unit (not illustrated) for detecting the remaining capacity of the rechargeable battery 59 (remaining battery capacity), determine whether to return to a predetermined charging facility on the basis of the detected remaining battery capacity, and automatically return to a charging facility if the remaining battery capacity is less than a predetermined remaining capacity level.

The restart switch 60 is an input member disposed on the body 10 of the autonomous traveling apparatus 1 to allow the autonomous traveling apparatus 1 to resume (restart) traveling from a stop mode. The restart switch 60 is operated by a user to express their intention to cause the autonomous traveling apparatus 1 to restart after the autonomous traveling apparatus 1 is temporarily stopped. For safety, it is desirable that the restart switch 60 be placed at a special position on the body 10 of the autonomous traveling apparatus 1 so as to prevent a third party from easily operating the restart switch 60. For explicit operation, it is desirable to use a push-button switch, for example.

While a single input member may be used as the restart switch 60, a plurality of input members may be disposed at different positions on the body 10.

The restart control unit 61 controls the operation of the autonomous traveling apparatus 1 after the user has operated the restart switch 60.

In particular, when the user performs an operation of activating the restart switch 60, the restart control unit 61 causes the obstacle detection unit 57 to resume obstacle detection so as not to detect the user, who has performed the operation of activating the restart switch 60, as an obstacle until the user moves out of the obstacle sensing area and causes the autonomous traveling apparatus 1 to resume traveling.

Specifically, as described below, the restart control unit 61 sets an obstacle sensing area, performs a user absence detection process, determines whether a recovery waiting time has elapsed, and determines the travel direction after a restart, for example.

The restart control unit 61 mainly limits the obstacle detection function to be enabled. After the user who has operated the restart switch 60 moves out of the obstacle sensing area, the restart control unit 61 may perform a normal autonomous traveling and obstacle detection process.

The sensing area setting unit 62 sets an obstacle sensing area for detecting an object after the user has performed an operation of activating the restart switch 60. Alternatively, the sensing area setting unit 62 sets an area (user absence sensing area) for sensing the absence of the user who has operated the restart switch 60.

Figure 8:
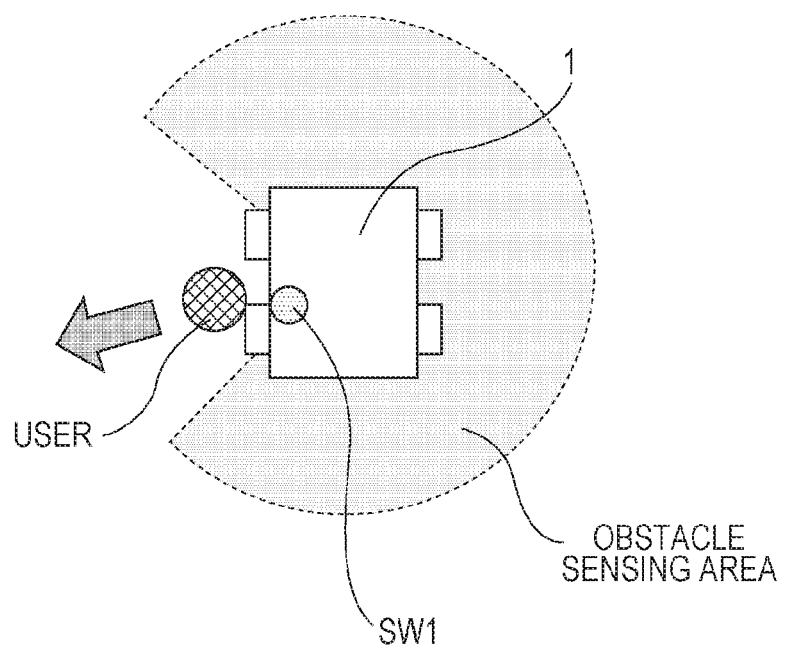
FIG. 8 is a diagram illustrating a case where a user, after pressing a restart switch on a left side surface, moves to the left.

For example, when an operation of activating the restart switch 60 is performed, the sensing area setting unit 62 may set, as an obstacle sensing area, an area other than the vicinity of the position at which the restart switch 60 is disposed. Specifically, as illustrated in FIG. 8 described below, a predetermined neighboring area including the position at which the restart switch 60 is attached is excluded from the obstacle sensing area and the remaining area may be set as an obstacle sensing area.

Thereafter, the restart control unit 61 may cause the obstacle detection unit 57 to resume obstacle detection so as to detect an object located within the obstacle sensing area as an obstacle.

In this case, the obstacle detection process may be resumed for the set obstacle sensing area immediately after the restart switch 60 has been operated by the user.

Further, when the user performs an operation of activating the restart switch 60, an obstacle sensing area may be set as a user absence sensing area for detecting the absence of the user who has performed the operation of activating the restart switch 60. Specifically, as illustrated in FIG. 12B described below, a predetermined neighboring area including the position at which the restart switch 60 is attached may be set as an area for detecting the absence of the user.

In this case, an obstacle detection process is started for the set user absence sensing area and, when the obstacle detection unit 57 detects the absence of the user in the set user absence sensing area, it is determined that the user has moved away from the autonomous traveling apparatus 1.

Thereafter, the sensing area setting unit 62 may reset an obstacle sensing area for detecting an obstacle, and the restart control unit 61 may cause the obstacle detection unit 57 to resume obstacle detection so as to detect an object located within the reset obstacle sensing area as an obstacle to execute a normal autonomous traveling and obstacle detection process.

Figures 13A, 13B, 13C:
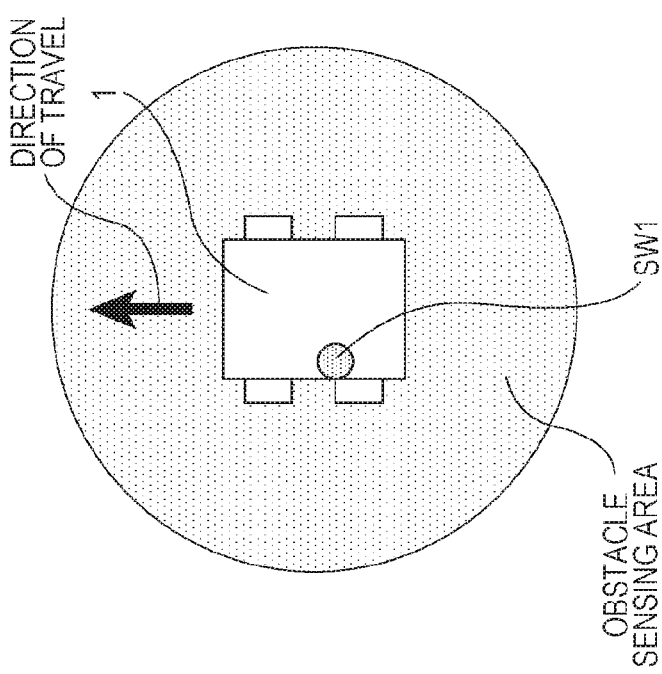
FIGS. 13A to 13C are schematic diagrams illustrating how the user, after pressing the restart switch, moves away from the autonomous traveling apparatus and the autonomous traveling apparatus starts traveling according to a third embodiment.

Alternatively, as illustrated in FIG. 13B described below, the user absence sensing area may be set only in an area near the position at which the restart switch 60 is disposed.

Figure 7A:
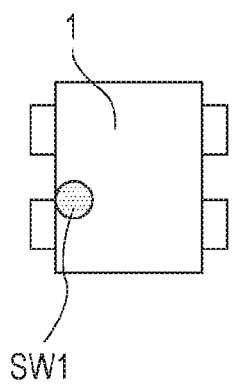
FIGS. 7A and 7B are schematic diagrams illustrating examples of a position(s) where a restart switch(es) is attached according to the embodiments of the present disclosure.
Figure 7B:
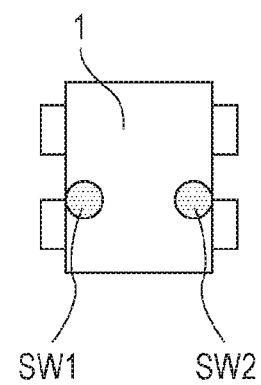

FIGS. 7A and 7B schematically illustrate examples of a position(s) where the restart switch(es) 60 is attached.

FIG. 7A illustrates the case where a single restart switch 60 is disposed, and FIG. 7B illustrates the case where two restart switches 60 are disposed.

In FIGS. 7A and 7B, the upward direction is taken to be the direction of travel of the autonomous traveling apparatus 1. In this case, in FIG. 7A, a restart switch SW1 is disposed on the left side surface of the autonomous traveling apparatus 1. Alternatively, the restart switch SW1 may be disposed on the right side surface of the autonomous traveling apparatus 1.

In FIG. 7B, restart switches SW1 and SW2 are disposed on the left side surface and the right side surface of the autonomous traveling apparatus 1, respectively.

The location where the restart switch or switches 60 are attached is not limited to that illustrated in FIGS. 7A and 7B, and the restart switch or switches 60 may be disposed in a front surface portion and/or a rear surface portion of the autonomous traveling apparatus 1 in the direction of travel.

Alternatively, three or more restart switches 60 may be attached.

As in FIG. 7A, when the restart switch SW1 is disposed on the left side surface, the user approaches the left side surface of the autonomous traveling apparatus 1 from the left and performs an operation of pressing the restart switch SW1. After the operation of pressing the restart switch SW1, the user moves to the left in order to move away from the autonomous traveling apparatus 1.

FIG. 8 illustrates a case where the user, after pressing the restart switch SW1 disposed on the left side surface, moves to the left.

When the restart switch SW1 is pressed, the autonomous traveling apparatus 1 starts a predetermined functional block and attempts to start traveling autonomously. Since the user stays near the left side surface immediate after pressing the restart switch SW1, immediate startup of the obstacle detection function may cause the user to be detected as an obstacle. Accordingly, the autonomous traveling apparatus 1 may stop again.

In embodiments of the present disclosure, a variety of methods described below are used to prevent the user from being detected as an obstacle to provide safe resumption of autonomous traveling.

For example, in FIG. 8, after the user has pressed the restart switch SW1, a portion near the left side surface of the autonomous traveling apparatus 1 where the user is predicted to stay is excluded from the obstacle sensing area, and the obstacle detection function is started for the area other than the portion near the left side surface.

For instance, it takes about several seconds to ten and several seconds for the user to move out of the obstacle sensing area after the user presses the restart switch SW1. In this case, for a period of about 10 seconds to 20 seconds after the restart switch SW1 has been pressed, a portion near the left side surface of the autonomous traveling apparatus 1 may be excluded from the obstacle sensing area and the obstacle detection function may be executed for an area other than the vicinity of the left side surface of the autonomous traveling apparatus 1. Then, after the period described above has elapsed, the user may be regarded as having moved out of the obstacle sensing area and a normal obstacle sensing area including the portion near the left side surface of the autonomous traveling apparatus 1 may be set to start traveling autonomously. The process described above corresponds to a process in a first embodiment described below.

In addition to the constituent components described above, a collision detection unit for detecting a collision or contact of the vehicle 1 with an obstacle during traveling or detecting an approach of the vehicle 1 to an obstacle during traveling may further be included.

For example, a contact sensor or a contactless sensor, examples of which include a pressure-sensitive switch, a microswitch, an ultrasonic sensor, and an infrared range sensor, is used and is disposed on the bumper of the body 10, for example.

A single collision detection unit may be used. Desirably, however, a plurality of collision detection units are disposed at predetermined positions in each of the front, side surface, and rear portions of the body 10 to ensure detection of collisions from the front, rear, and side.

For example, a plurality of ultrasonic sensors may be disposed between an elastic member forming the bumper and the body 10 in such a manner as to be spaced a predetermined distance from each other to measure distance to a nearby object.

The storage unit 70 stores information or programs necessary to execute the functions of the autonomous traveling apparatus 1, and is a semiconductor memory element such as a ROM, a RAM, or a flash memory, a storage device such as a hard disk drive (HDD) or a solid state drive (SSD), or any other storage medium. The storage unit 70 stores, for example, input image data 71, measured distance information 72, current position information 73, route information 74, to-be-transmitted monitoring information 75, obstacle information 76, a recovery waiting time 77, switch position information 78, and so on.

The input image data 71 is image data of an image captured with the camera 55. When a plurality of cameras are disposed, image data obtained for each camera is stored. The image data may be either still image data or moving image data. The image data is used to detect a suspicious person, detect an anomaly, or determine the direction of the vehicle 1, for example, and is transmitted to the management server 5 as a piece of to-be-transmitted monitoring information 75.

The measured distance information 72 is a light-receiving distance L0 calculated from the information acquired from the distance detection unit 51 in the way described above. A single light-receiving distance L0 indicates a distance measured at a single measurement point within a predetermined distance measurement area.

The measured distance information 72 is stored for each measurement point within the predetermined distance measurement area and is stored in association with position information on the measurement point. For example, if m measurement points are arranged in the horizontal direction and n measurement points are arranged in the vertical direction, light-receiving distances L0, each corresponding to one of the m×n measurement points in total, are stored.

If an object (such as an obstacle, a road surface, or a post) from which laser light is reflected is located in the direction toward each measurement point and reflected light from the object is successfully received, the light-receiving distance L0 to the object is stored. If no object is located in a measurement-point direction, no reflected light is received. Thus, for example, information indicating a measurement failure may be stored instead of a light-receiving distance L0 as the measured distance information 72.

The current position information 73 is information indicating the current position of the vehicle 1, which is acquired by the position information acquisition unit 58. The current position information 73 is, for example, information constituted by the latitude and longitude acquired using GPS. The current position information 73 is used to determine the direction of the vehicle 1, for example.

The route information 74 is information indicating a predetermined driving route of the vehicle 1, and a map of a route along which the vehicle 1 is to travel is stored in advance. For example, if the route along which or the area within which the vehicle 1 is to move is fixedly determined in advance, such a route or area is initially stored as fixed information. To change the route or the like, information transmitted from the management server 5 via the network 6 may be stored as new route information 74.

The to-be-transmitted monitoring information 75 is information on a variety of targets of surveillance, which is acquired using the camera 55 or the like while the autonomous traveling apparatus is traveling and while the autonomous traveling apparatus stops, and is transmitted to the management server 5 via the network 6. Examples of the to-be-transmitted monitoring information 75 include the input image data 71 obtained by the camera 55, the distance traveled, the movement route, environmental data (such as temperature, humidity, radiation, gas, rainfall, audio, and ultraviolet radiation), geographical data, obstacle data, road surface information, and warning information.

The obstacle information 76 is information concerning each measurement point or each detected obstacle and is constituted by the distance from the current position to the obstacle, the features of the obstacle, such as the shape, position, direction, size, color, height, and angle of inclination, and so on. For example, the shape and size of an obstacle and the distance to the obstacle are acquired by the distance detection unit 51 and are stored as part of the obstacle information 76. The camera 55, the image recognition unit 56, and the obstacle detection unit 57 are also used to acquire information for identifying an obstacle.

The recovery waiting time 77 is a time taken from when an operation of activating the restart switch 60 is performed until obstacle detection is resumed, and is set in advance by, for example, the user.

Specifically, the recovery waiting time 77 starts to be counted when the user presses the restart switch 60 (hereinafter also referred to as the restart switch SW), and the obstacle detection function is resumed after the time corresponding to the recovery waiting time 77 has elapsed.

In order to prevent the user located near the vehicle 1 from being detected as an obstacle, a time longer than the time expected to be taken for the user to move out of the obstacle sensing area after the user has pressed the restart switch SW is set as the recovery waiting time 77 (hereinafter also referred to as the recovery waiting time WT). For example, it takes about 10 seconds for the user to move out of the obstacle sensing area after the user has pressed the restart switch SW. In this case, a time longer than 10 seconds (for example, 15 seconds) is set in advance as the recovery waiting time WT.

A timer for the recovery waiting time WT is started when the user presses the restart switch SW, and the obstacle detection function is started after the lapse of the set recovery waiting time WT. This can prevent the user who has pressed the restart switch SW from being detected as an obstacle.

The switch position information 78 is information indicating the position at which the restart switch SW is disposed on the autonomous traveling apparatus 1.

For example, when the restart switch SW1 is disposed at the position illustrated in FIG. 7A, information ("near the left rear wheel") indicating that the restart switch SW1 is disposed near the left rear wheel on the left side surface of the vehicle 1 is stored. When the two restart switches SW1 and SW2 are disposed at the positions illustrated in FIG. 7B, information indicating that the restart switches SW1 and SW2 are respectively disposed "near the left rear wheel" and "near the right rear wheel" is stored.

The switch position information 78 is used when the sensing area setting unit 62 sets an obstacle sensing area to resume the obstacle detection function at the time of restarting. For instance, the switch position information 78 indicates a position "near the left rear wheel". In this case, as illustrated in FIG. 8, a portion "near the left rear wheel" is excluded from the obstacle sensing area and the remaining area is set as an obstacle sensing area to resume the obstacle detection function. This is because when the restart switch SW is located "near the left rear wheel", the user who has pressed the restart switch SW may still be located "near the left rear wheel" and stay within the obstacle sensing area near the left rear wheel, so that this user will not be detected as an obstacle after the resumption of the obstacle detection function.

When the two restart switches SW1 and SW2 are disposed at positions "near the left rear wheel" and "near the right rear wheel", an area near the position of one of the restart switches SW1 and SW2 pressed by the user is excluded from the obstacle sensing area and the remaining area is set as an obstacle sensing area to resume the obstacle detection function.

Figure 9A:
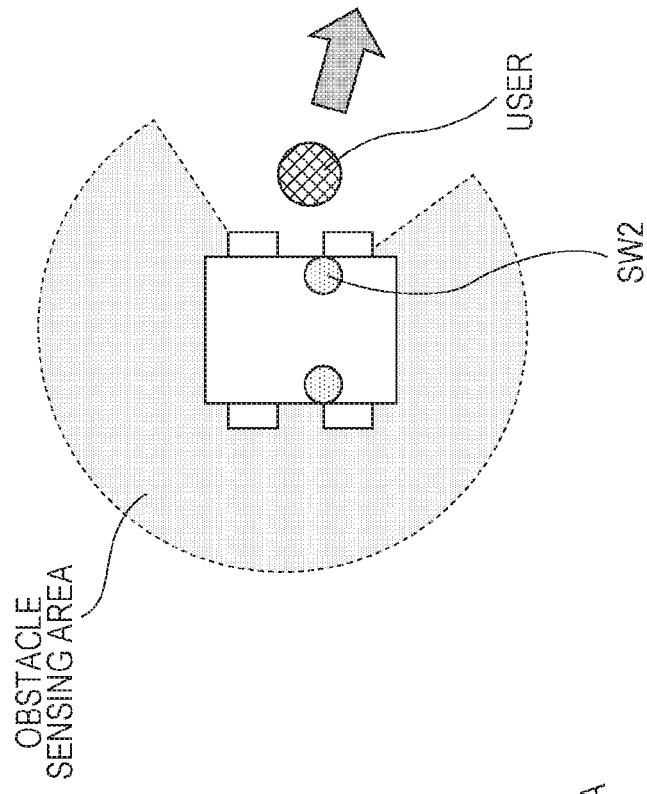
FIGS. 9A and 9B illustrate obstacle sensing areas set when the user presses either of two restart switches.
Figure 9B:
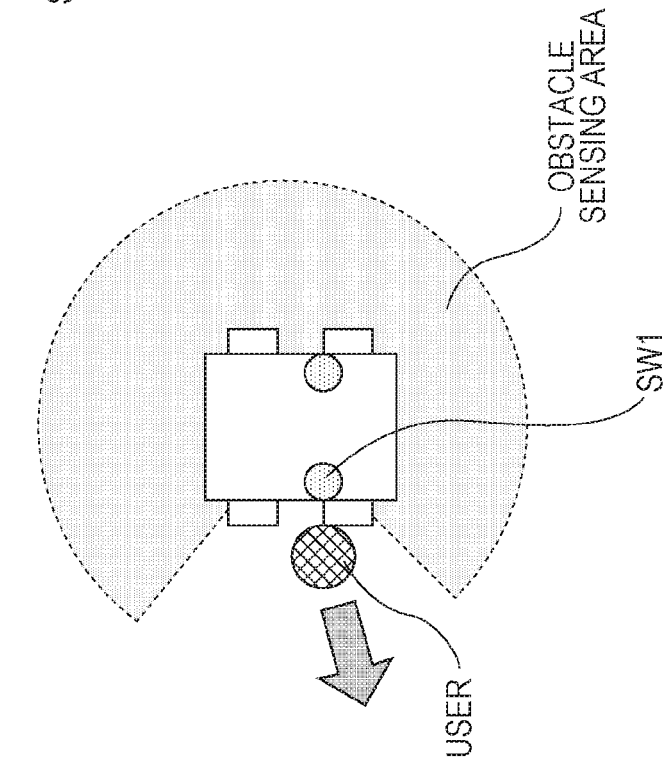

FIGS. 9A and 9B illustrate obstacle sensing areas set when the user presses either of the two restart switches SW1 and SW2.

For example, as illustrated in FIG. 9A, when the user presses the restart switch SW1 "near the left rear wheel" among the two restart switches SW1 and SW2, a portion "near the left rear wheel" is excluded from the obstacle sensing area and the remaining area is set as an obstacle sensing area.

As illustrated in FIG. 9B, when the user presses the restart switch SW2 "near the right rear wheel" among the two restart switches SW1 and SW2, a portion "near the right rear wheel" is excluded from the obstacle sensing area and the remaining area is set as an obstacle sensing area.

When three or more restart switches SW are disposed, an area near the position of one of the restart switches SW pressed by the user is excluded from the obstacle sensing area.

Alternatively, all areas near the positions of the restart switches SW may be excluded from the obstacle sensing area.

Examples of Restart Process

Some examples of a restart process performed after the restart switch 60 has been pressed will be described hereinafter.

The following examples mainly assume that a single restart switch SW1 is disposed near the left rear wheel on the left side surface of a vehicle. As described above, a restart switch disposed at any other position or two or more restart switches may be used.

First Embodiment

A description will be given of an example in which the obstacle detection function is started to start traveling of a vehicle after a recovery waiting time has elapsed since a restart switch was activated. Specifically, when the user performs an operation of activating the restart switch 60 while the vehicle 1 is in stop mode, after the lapse of the recovery waiting time 77, the restart control unit 61 may cause the obstacle detection unit 57 to resume obstacle detection so as to detect an object located within the obstacle sensing area as an obstacle and may cause the vehicle 1 to start traveling autonomously.

FIGS. 10A to 10D schematically illustrate how the autonomous traveling apparatus 1 which is normally traveling stops upon detection of an obstacle and the user presses the restart switch 60 and then moves away from the autonomous traveling apparatus 1.

FIG. 10A illustrates a state where the autonomous traveling apparatus 1 is normally traveling. In this state, a circular obstacle sensing area including the entire 360-degree area surrounding the vehicle 1, as well as the area in the direction of travel of the vehicle 1, is set so that an obstacle within a predetermined radius is detectable.

FIG. 10B illustrates a state where the vehicle 1, when normally traveling in the manner illustrated in FIG. 10A, stops upon detection of an obstacle ahead in the direction of travel. In this state, the obstacle detection function is also disabled.

In the stop mode, the traveling function and the obstacle detection function are disabled, whereas the function of checking whether the restart switch 60 has been activated (pressed) remains enabled.

FIG. 10C illustrates a press-ready state in which whether the restart switch 60 (SW1) has been activated (pressed) is checked after the vehicle 1 has entered the stop mode. Since the obstacle detection function is disabled in this state, the user who is approaching the vehicle 1 is not detected as an obstacle.

In the stop mode, the user approaches the vicinity of the autonomous traveling apparatus 1 to examine the cause of the stoppage and removes the obstacle, if necessary, so that the autonomous traveling apparatus 1 can resume traveling without a problem.

Thereafter, the user presses the restart switch SW1 to resume traveling of the autonomous traveling apparatus 1. In the case illustrated in FIG. 10C, the user approaches the vicinity of the left rear wheel where the restart switch SW1 is disposed and presses the restart switch SW1.

FIG. 10D illustrates a state immediately after the user has pressed the restart switch SW1, in which the user is to move away from the autonomous traveling apparatus 1. The autonomous traveling apparatus 1 is still in stop mode immediately after the restart switch SW1 has been pressed.

FIGS. 11A to 11C schematically illustrate how the user, after pressing the restart switch 60, moves away from the autonomous traveling apparatus 1 and the autonomous traveling apparatus 1 starts traveling according to the first embodiment.

FIG. 11A illustrates the stop mode, which is identical to that illustrated in FIG. 10D.

FIG. 11B illustrates a state where the autonomous traveling apparatus 1 is in stop mode and is waiting for the recovery waiting time 77 to elapse. As described above, when the user presses the restart switch SW1, the preset timer for the recovery waiting time 77 is started and waits for the recovery waiting time 77 to elapse.

During the recovery waiting time 77, the obstacle detection function is disabled to prevent the user from being detected as an obstacle.

The user moves away as far as possible from the autonomous traveling apparatus 1 during the recovery waiting time 77.

FIG. 11C illustrates a state where the autonomous traveling apparatus 1 has resumed traveling after the lapse of the recovery waiting time 77. As in FIG. 10A, a circular obstacle sensing area is set so that an obstacle within a predetermined radius is detectable.

If no obstacle is located within the obstacle sensing area nor is the user located within the obstacle sensing area, the autonomous traveling apparatus 1 returns to the normal traveling mode.

In the example described above, the execution of the obstacle detection function for the entire circular obstacle sensing area is retarded until the recovery waiting time 77 elapses. Alternatively, an area for which the execution of the obstacle detection function is retarded may be limited to an area near the position of the restart switch SW1.

Accordingly, the obstacle detection function is disabled and the autonomous traveling apparatus 1 does not start traveling for a period until the recovery waiting time 77 elapses after the user has actually pressed the restart switch SW1 attached to the autonomous traveling apparatus 1. This can prevent the user who has performed the restart switch SW1 from being detected as an obstacle and can ensure that the autonomous traveling apparatus 1 travels safely after a restart.

Second Embodiment

A description will be given of an example in which the leaving of the user during a predetermined time after a restart switch has been activated is detected and a vehicle starts traveling upon detection of the absence of the user.

Also in a second embodiment, a change in state occurs in a manner similar to that in FIGS. 10A to 10D. After pressing the restart switch SW1, the user is to move away from the autonomous traveling apparatus 1.

FIGS. 12A to 12C schematically illustrate how the user, after pressing the restart switch SW1, moves away from the autonomous traveling apparatus 1 and the autonomous traveling apparatus 1 starts traveling according to the second embodiment.

FIG. 12A illustrates the stop mode, which is identical to that illustrated in FIG. 10D.

FIG. 12B illustrates a state in which a user absence detection function has been started immediately after the user has pressed the restart switch SW1 when the autonomous traveling apparatus 1 is in stop mode. Immediately after the user has pressed the restart switch SW1, the user can probably stay near the autonomous traveling apparatus 1. An obstacle detection function is immediately started, and a predetermined user absence sensing area is set to detect the user located within the set user absence sensing area. Thereafter, the leaving of the user within a predetermined time is detected.

In response to detection of leaving of the user, the function is changed to an obstacle detection function to detect an obstacle other than the user to resume traveling of the autonomous traveling apparatus 1.

FIG. 12C illustrates a state in which the autonomous traveling apparatus 1 has resumed traveling after the leaving of the user has been detected. As in FIG. 10A, a circular obstacle sensing area is set so that an obstacle within a predetermined radius is detectable.

If no obstacle is located within the obstacle sensing area nor is the user located within the obstacle sensing area, the autonomous traveling apparatus 1 returns to the normal traveling mode.

Accordingly, an obstacle detection function is started immediately after the user has actually pressed the restart switch SW1 attached to the autonomous traveling apparatus 1, and the autonomous traveling apparatus 1 resumes traveling upon detection of leaving of the user who has pressed the restart switch SW1. This can reliably prevent the user who has performed the restart switch SW1 from being detected as an obstacle and can ensure that the autonomous traveling apparatus 1 travels safely after a restart without waiting for the recovery waiting time 77 to elapse.

The leaving of the user who has pressed the restart switch SW1 may be detected using the camera 55 instead of using a LIDAR device. The camera 55 may be oriented toward the restart switch SW1 to capture an image of the user so as to detect the presence or absence of the user.

Third Embodiment

A description will be given of an example in which, as in the second embodiment, the leaving of the user during a predetermined time after a restart switch has been activated is detected, where an area for detecting the absence of the user is limited.

Also in a third embodiment, a change in state occurs in a manner similar to that in FIGS. 10A to 10D. After pressing the restart switch SW1, the user is to move away from the autonomous traveling apparatus 1.

FIGS. 13A to 13C schematically illustrate how the user, after pressing the restart switch SW1, moves away from the autonomous traveling apparatus 1 and the autonomous traveling apparatus 1 starts traveling according to the third embodiment.

FIG. 13A illustrates the stop mode, which is identical to that illustrated in FIG. 10D.

FIG. 13B illustrates a state in which a user absence detection function has started immediately after the user has pressed the restart switch SW1 when the autonomous traveling apparatus 1 is in stop mode.

Also, as in the second embodiment, an obstacle detection function is started immediately after the user has pressed the restart switch SW1. Unlike FIG. 12B, the user absence sensing area is limited to a portion near the position of the restart switch SW1. In FIG. 13B, since the restart switch SW1 is disposed near the left rear wheel, an area located to the left of the autonomous traveling apparatus 1 is set as the user absence sensing area. The user who is still located within the limited user absence sensing area is detected. Thereafter, the leaving of the user within a predetermined time is detected.

In response to detection of leaving of the user, as in the second embodiment, the function is changed to an obstacle detection function for detecting an obstacle other than the user to resume traveling of the autonomous traveling apparatus 1.

FIG. 13C illustrates a state in which the autonomous traveling apparatus 1 has resumed traveling after the leaving of the user has been detected. As in FIG. 12C, a circular obstacle sensing area is set so that an obstacle within a predetermined radius is detectable.

Accordingly, the user who has actually pressed the restart switch SW1 is considered to be more likely to move in a direction away from the position of the restart switch SW1. This can reliably prevent the user from being detected as an obstacle and can ensure that the autonomous traveling apparatus 1 travels safely after a restart if a limited user absence sensing area is set near the position of the restart switch SW1.

Fourth Embodiment

A description will be given of an example in which an area for detecting an obstacle is limited during a predetermined time taken for the user to move out of the obstacle sensing area after a restart switch has been activated.

Also in a fourth embodiment, a change in state occurs in a manner similar to that in FIGS. 10A to 10D. After pressing the restart switch SW1, the user is to move away from the autonomous traveling apparatus 1.

FIGS. 14A to 14C schematically illustrate how the user, after pressing the restart switch SW1, moves away from the autonomous traveling apparatus 1 and the autonomous traveling apparatus 1 starts traveling according to the fourth embodiment.

FIG. 14A illustrates the stop mode, which is identical to that illustrated in FIG. 10D.

FIG. 14B illustrates a state in which an obstacle detection function with a limited obstacle sensing area has started immediately after the user has pressed the restart switch SW1 when the autonomous traveling apparatus 1 is in stop mode.

In the fourth embodiment, as in the second embodiment or the like, an obstacle detection function is started immediately after the user has pressed the restart switch SW1. Unlike FIG. 13B, an area other than the user absence sensing area illustrated in FIG. 13B is set as an obstacle sensing area for which the obstacle detection function is executed.

That is, obstacle detection is not performed on a portion near the position of the restart switch SW1 where the user can probably stay.

On the other hand, the obstacle detection function for the obstacle sensing area illustrated in FIG. 14B, where the user is less likely to stay, is started immediately after the restart switch SW1 has been pressed.

Thereafter, for example, if no obstacle is detected within the obstacle sensing area illustrated in FIG. 14B after the recovery waiting time 77 described above has elapsed since the restart switch was pressed, as in the second embodiment or the like, the area for detecting an obstacle is changed to a normal obstacle sensing area to resume traveling of the autonomous traveling apparatus 1.

FIG. 14C illustrates a state in which the autonomous traveling apparatus 1 has resumed traveling. As in FIG. 12C, a circular obstacle sensing area is set so that an obstacle located within a predetermined radius is detectable.

After the recovery waiting time 77 has elapsed, instead of the obstacle sensing area illustrated in FIG. 14B being expanded directly to that in FIG. 14C, the obstacle sensing area illustrated in FIG. 14B may be gradually increased in size with time, whereas the size of the area near the position of the restart switch SW1 is gradually decreased with time, to obtain the circular obstacle sensing area illustrated in FIG. 14C after the recovery waiting time 77 has elapsed.

Accordingly, the user who has actually pressed the restart switch SW1 is considered to be more likely to move in a direction away from the position of the restart switch SW1. Thus, an obstacle detection function is immediately started for an area other than the area near the position of the restart switch SW1, which can reliably prevent the user from being detected as an obstacle. In addition, the obstacle detection function can be immediately resumed for an area where the user is considered to be absent, thereby ensuring that the autonomous traveling apparatus 1 travels safely after a restart.

Fifth Embodiment

A description will be given of an example in which a device used for obstacle detection is limited when an obstacle detection function is resumed after a restart switch has been activated.

That is, the restart control unit 61 may enable at least one of the LIDAR device 51, the camera 55, and a plurality of ultrasonic sensors so that an object located within an obstacle sensing area set by the sensing area setting unit 62 is detectable.

In this embodiment, a LIDAR device, a camera, and ultrasonic sensors are included as devices used for obstacle detection. However, the devices used for obstacle detection are not limited to a LIDAR device, a camera, and ultrasonic sensors.

Figure 15:
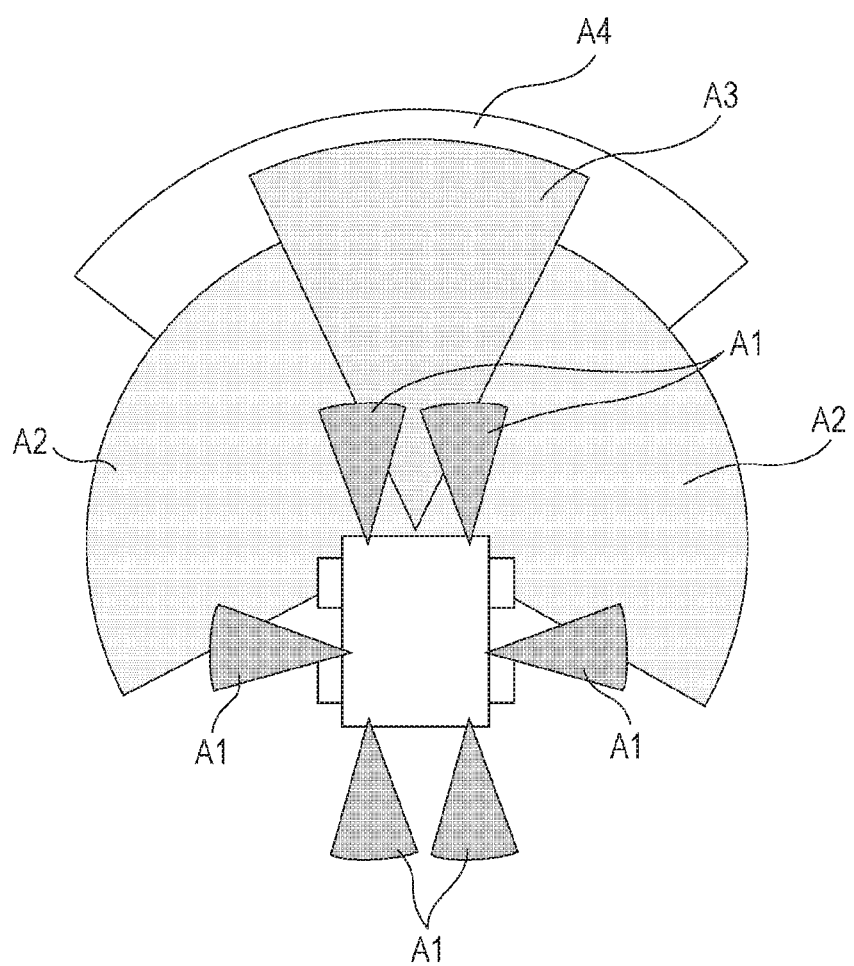
FIG. 15 is a schematic diagram illustrating an example of a device used for obstacle detection.

FIG. 15 schematically illustrates an example of a device used for obstacle detection.

In FIG. 15, four devices, namely, ultrasonic sensors (A1), a 2D LIDER device (A2), a 3D LIDER device (A3), and a camera (A4), are used for obstacle detection.

The ultrasonic sensors include two ultrasonic sensors on a front surface of a vehicle in the direction of travel, one ultrasonic sensor on a left side surface, one ultrasonic sensor on a right side surface, and two ultrasonic sensors on a rear surface. The areas A1 are an example of the respective obstacle sensing areas of the ultrasonic sensors.

As described above, LIDER devices are arranged on the front surface of the vehicle in the direction of travel. The areas A2 are the obstacle sensing areas of the 2D LIDER device, and the area A3 is the obstacle sensing area of the 3D LIDER device. The area A4 is the obstacle sensing area of the camera on the front surface of the vehicle in the direction of travel.

To realize normal autonomous traveling, an obstacle sensing area is set for each of the four types of areas (A1 to A4) and the obstacle detection function is executed.

When the obstacle detection function is resumed after a restart switch has been activated, for example, as in FIG. 8, if an obstacle sensing area is set to an area other than an area near the position of the restart switch, the ranges covered by the four devices to be enabled are limited as follows.

Among the ultrasonic sensors, the ultrasonic sensor on the left side surface is disabled and the other ultrasonic sensors are enabled.

The 2D LIDER device is enabled for an area other than the area near the position of the restart switch. The 3D LIDER device is enabled in a normal way since the obstacle sensing area of the 3D LIDER device is ahead of the vehicle in the direction of travel.

The camera is enabled for an area other than the area near the position of the restart switch.

Accordingly, when an obstacle sensing area is limited, devices to be used for obstacle detection are enabled on the basis of the position and direction of a set obstacle sensing area.

Sixth Embodiment

A description will be given of an example that enables avoidance of an obstacle upon detection of the obstacle, which is still present, when an obstacle detection function is resumed after a restart switch has been activated.

Specifically, after the restart control unit 61 has caused the obstacle detection unit 57 to resume obstacle detection so as to detect an object located within an obstacle sensing area as an obstacle, upon detection of an obstacle within the obstacle sensing area, the travel control unit 52 may cause the autonomous traveling apparatus 1 to travel in a direction in which the autonomous traveling apparatus 1 does not collide with the detected obstacle.

FIGS. 16A and 16B schematically illustrate an example that enables avoidance of a detected obstacle after an obstacle detection function has been resumed.

FIG. 16A illustrates a state where an autonomous traveling apparatus according to a sixth embodiment, when normally traveling, stops upon detection of an obstacle in the direction of travel.

The obstacle detected in FIG. 16A is still present although the user has input a restart switch in the stop mode.

If the obstacle detection function is resumed in this state, the obstacle is detected as an obstacle and the autonomous traveling apparatus stops again so long as the obstacle is within the obstacle sensing area. Accordingly, as in FIG. 16A, when the autonomous traveling apparatus stops upon detection of an obstacle, information on the obstacle, such as the position or direction of the obstacle, is stored.

If the direction of travel of the autonomous traveling apparatus after a restart coincides with the direction in which the obstacle associated with the stored information is present, the autonomous traveling apparatus again stops traveling and waits for the user to activate the restart switch.

If the direction of travel of the autonomous traveling apparatus after a restart does not coincide with the direction in which the obstacle associated with the stored information is present, the autonomous traveling apparatus will not collide with the obstacle and thus resumes autonomous traveling even if the obstacle is detected within the obstacle sensing area.

FIG. 16B illustrates an example of directions in which the autonomous traveling apparatus can travel after a restart when an obstacle is present.

If an obstacle is located at the position illustrated in FIG. 16B, for example, the autonomous traveling apparatus can travel in seven directions indicated by arrows in FIG. 16B. However, the directions in which the autonomous traveling apparatus can travel are not limited to the seven directions indicated by arrows so long as the autonomous traveling apparatus will not collide with the obstacle.

If the direction of travel of the autonomous traveling apparatus after a restart coincides with the direction in which the obstacle associated with the stored information is present, the autonomous traveling apparatus may change the direction of travel by, for example, traveling in any of the seven directions indicated by arrows in FIG. 16B to avoid the obstacle and make a detour on the way to the destination.

If no obstacle is detected within the obstacle sensing area after the direction of travel has been changed, the autonomous traveling apparatus may be able to travel over the 360-degree range.

Seventh Embodiment

A description will be given of an example in which a length of the recovery waiting time is set in accordance with the maximum detection distance to an object that is detectable by the distance detection unit 51 after a restart switch has been activated.

FIGS. 17A and 17B schematically illustrate an example in which, after an obstacle detection function has been resumed, different recovery waiting times are set if an obstacle is detectable over different distances.

For instance, an obstacle is detected using the LIDAR device 51. In this case, the maximum distance to an object that is detectable by the LIDAR device 51 (hereinafter also referred to as a detectable distance) is limited in accordance with the performance of the distance detection function of the LIDAR device 51. The maximum distance to an obstacle that is detectable may change depending on the performance of the LIDAR device 51.

If the detectable maximum detection distance is comparatively long, it is likely to take a long time for the user who has activated the restart switch 60 to move out of an obstacle sensing area defined by the maximum detection distance. If the detectable maximum detection distance is comparatively short, it is likely to take a short time for the user who has activated the restart switch 60 to move out of the obstacle sensing area.

Thus, if the maximum detection distance is comparatively long, the recovery waiting time is set long in advance. If the maximum detection distance is comparatively short, the recovery waiting time is set short in advance.

FIG. 17A illustrates a case where an obstacle sensing area set after the obstacle detection function has been resumed has a comparatively short detectable distance, and FIG. 17B illustrates a case where the obstacle sensing area has a comparatively long detectable distance.

A detectable distance R1 illustrated in FIG. 17A is assumed to be shorter than a detectable distance R2 illustrated in FIG. 17B (R1<R2).

In this case, in FIG. 17A, when the detectable distance R1 is relatively short, the obstacle detection function is resumed from the stop mode after a comparatively short recovery waiting time T1 has elapsed since the user activated the restart switch 60.

In FIG. 17B, in contrast, when the detectable distance R2 is relatively long, the obstacle detection function is resumed from the stop mode after a comparatively long recovery waiting time T2 has elapsed since the user activated the restart switch 60. The recovery waiting time T2 is set longer than the recovery waiting time T1 (T2>T1).

This can ensure a sufficiently long time for the user to move out of the obstacle sensing area when the time taken to resume the obstacle detection function is set long.

When the detectable distance is comparatively short, the user is expected to move out of the obstacle sensing area for a comparatively short time. Thus, the time taken to resume the obstacle detection function may be set short. Thus, by reducing the time taken to resume the obstacle detection function, safe autonomous traveling can be resumed as quickly as possible.

Since the detectable distance and the recovery waiting time are considered to be substantially proportional, the recovery waiting time may be determined using a predetermined calculation formula in accordance with, for example, the length of the detectable distance determined in advance based on the performance of the LIDAR device. Thus, the time taken to resume the obstacle detection function is appropriately set, which can ensure a sufficient time for the user to move out of the obstacle sensing area and can provide quick resumption of safe autonomous traveling.

Eighth Embodiment

In the second and third embodiments described above, in order to detect the absence of the user, the camera 55 may capture an image of the user who has activated the restart switch 60 to perform person recognition.

In order to perform person recognition, image data of specific persons who can perform an operation of activating the restart switch 60 is stored in advance in the storage unit 70.

If an image of a person that has been captured with the camera 55 matches any of images corresponding to image data of the specific persons stored in advance in the storage unit 70, a user absence sensing area may be set in the way described above in the second or third embodiment and the obstacle detection function may be resumed in a normal way after the user has moved out of the user absence sensing area.

This can reliably prevent a specific reliable user from being detected as an obstacle and can ensure that the autonomous traveling apparatus 1 travels safely after a restart.

If an image of a person that has been captured with the camera 55 does not match any of the images corresponding to image data of the specific persons stored in advance in the storage unit 70, the obstacle detection function may be immediately resumed in a normal way.

In this case, a suspicious, unreliable person might have activated the restart switch 60. Thus, the obstacle detection function is quickly resumed to detect the suspicious person as an obstacle, and a security function such as alerting is enabled. This can ensure that the autonomous traveling apparatus 1 travels safely after a restart.

The present disclosure contains subject matter related to that disclosed in Japanese Priority Patent Application JP 2016-147040 filed in the Japan Patent Office on Jul. 27, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An autonomous traveling apparatus comprising:
    a body;
    a travel control unit that controls a drive member to cause the autonomous traveling apparatus to travel;
    an obstacle detection unit that detects an object located within a predetermined obstacle sensing area;
    a restart switch disposed on the body and operable to cause the autonomous traveling apparatus to resume traveling from a stop mode; and
    a restart control unit that, when an operation of activating the restart switch is performed by a user, causes the obstacle detection unit to resume obstacle detection so as not to detect the user as an obstacle until the user who has performed the operation of activating the restart switch moves out of the obstacle sensing area, and causes the autonomous traveling apparatus to resume traveling.

2. The autonomous traveling apparatus according to claim 1, further comprising:
    a storage unit that stores a recovery waiting time taken from when the operation of activating the restart switch is performed until the obstacle detection is resumed, wherein
    in response to the operation of activating the restart switch when the autonomous traveling apparatus is in the stop mode, after lapse of the recovery waiting time, the restart control unit causes the obstacle detection unit to resume obstacle detection to detect an object located within the obstacle sensing area as an obstacle.

3. The autonomous traveling apparatus according to claim 1, further comprising:
    a sensing area setting unit that sets an obstacle sensing area for detecting an object after the operation of activating the restart switch has been performed, wherein
    in response to the operation of activating the restart switch, the sensing area setting unit sets as the obstacle sensing area an area other than an area near a position at which the restart switch is disposed, and then the restart control unit causes the obstacle detection unit to resume obstacle detection to detect an object located within the set obstacle sensing area as an obstacle.

4. The autonomous traveling apparatus according to claim 1, further comprising:
    a sensing area setting unit that sets an obstacle sensing area for detecting an object after the operation of activating the restart switch has been performed, wherein
    in response to the operation of activating the restart switch, the sensing area setting unit sets the obstacle sensing area as a user absence sensing area for detecting absence of the user who has performed the operation of activating the restart switch, and then, in response to the obstacle detection unit detecting absence of the user within the set user absence sensing area, the sensing area setting unit resets an obstacle sensing area for detecting an obstacle and the restart control unit causes the obstacle detection unit to resume obstacle detection to detect an object located within the reset obstacle sensing area as an obstacle.

5. The autonomous traveling apparatus according to claim 4, wherein the user absence sensing area is set in only an area near a position at which the restart switch is disposed.

6. The autonomous traveling apparatus according to claim 1, wherein the restart switch comprises one or more input members disposed at different positions on the body.

7. The autonomous traveling apparatus according to claim 2, wherein the restart switch comprises one or more input members disposed at different positions on the body.

8. The autonomous traveling apparatus according to claim 1, wherein
    in response to detection of an obstacle within the obstacle sensing area after the restart control unit has caused the obstacle detection unit to resume obstacle detection to detect an object located within the obstacle sensing area as an obstacle, the travel control unit causes the autonomous traveling apparatus to travel in a direction in which the autonomous traveling apparatus does not collide with the detected obstacle.

9. The autonomous traveling apparatus according to claim 2, wherein
    in response to detection of an obstacle within the obstacle sensing area after the restart control unit has caused the obstacle detection unit to resume obstacle detection to detect an object located within the obstacle sensing area as an obstacle, the travel control unit causes the autonomous traveling apparatus to travel in a direction in which the autonomous traveling apparatus does not collide with the detected obstacle.

10. The autonomous traveling apparatus according to claim 1, further comprising:
    a distance detection unit that emits predetermined light to the obstacle sensing area and receives light reflected by an object located within the obstacle sensing area to detect distance to the object, wherein the obstacle detection unit detects a position of the object to which the distance is detected by the distance detection unit.

11. The autonomous traveling apparatus according to claim 2, further comprising:

a distance detection unit that emits predetermined light to the obstacle sensing area and receives light reflected by an object located within the obstacle sensing area to detect distance to the object, wherein the obstacle detection unit detects a position of the object to which the distance is detected by the distance detection unit.

12. The autonomous traveling apparatus according to claim 10, wherein a recovery waiting time taken from when the operation of activating the restart switch is performed until the obstacle detection is resumed is set in accordance with a maximum detection distance to the object that is detectable by the distance detection unit.

13. The autonomous traveling apparatus according to claim 11, wherein the recovery waiting time is set in accordance with a maximum detection distance to the object that is detectable by the distance detection unit.

14. The autonomous traveling apparatus according to claim 10, wherein the distance detection unit includes a LIDAR device that emits laser light to at least one of a two-dimensional space and a three-dimensional space within a predetermined obstacle sensing area to measure distances to a plurality of measurement points within the obstacle sensing area, the autonomous traveling apparatus further comprises:

an imaging unit that captures an image of a predetermined space including a travel direction of the autonomous traveling apparatus; and a plurality of ultrasonic sensors disposed at predetermined positions on the body and configured to measure distance to an object near the body, and the restart control unit enables at least one of the LIDAR device, the imaging unit, and the plurality of ultrasonic sensors so that an object located within an obstacle sensing area that is set after the operation of activating the restart switch has been performed is detectable.

15. The autonomous traveling apparatus according to claim 11, wherein the distance detection unit includes a LIDAR device that emits laser light to at least one of a two-dimensional space and a three-dimensional space within a predetermined obstacle sensing area to measure distances to a plurality of measurement points within the obstacle sensing area, the autonomous traveling apparatus further comprises:

an imaging unit that captures an image of a predetermined space including a travel direction of the autonomous traveling apparatus; and a plurality of ultrasonic sensors disposed at predetermined positions on the body and configured to measure distance to an object near the body, and the restart control unit enables at least one of the LIDAR device, the imaging unit, and the plurality of ultrasonic sensors so that an object located within an obstacle sensing area that is set after the operation of activating the restart switch has been performed is detectable.

16. A method for restarting an autonomous traveling apparatus, the autonomous traveling apparatus including a body, a travel control unit that controls a drive member to cause the autonomous traveling apparatus to travel, an obstacle detection unit that detects an object located within a predetermined obstacle sensing area, a restart switch disposed on the body and operable to cause the autonomous traveling apparatus to resume traveling from a stop mode, and a restart control unit, the method comprising, by the restart control unit:

detecting whether a user has performed an operation of activating the restart switch;

detecting, in response to detection of the operation of activating the restart switch, whether the user who has performed the operation of activating the restart switch has moved out of the obstacle sensing area;

causing the obstacle detection unit to resume obstacle detection so as not to detect the user as an obstacle until movement of the user out of the obstacle sensing area is detected; and causing the travel control unit to resume traveling of the autonomous traveling apparatus.

17. A non-transitory computer readable medium storing a program for causing a computer to execute a process, the process comprising:

controlling a drive member to cause a vehicle to travel;

detecting an object located within a predetermined obstacle sensing area;

detecting activation of a restart switch, the restart switch being disposed on a body of the vehicle and operable to cause the vehicle to resume traveling from a stop mode; and in response to detection of an operation of activating the restart switch by a user, resuming obstacle detection so as not to detect the user as an obstacle until the user who has performed the operation of activating the restart switch moves out of the obstacle sensing area, and causing the vehicle to resume traveling.

* * * * *